US005731038A

United States Patent [19]

Ogasawara

[11] Patent Number: 5,731,038

[45] Date of Patent: Mar. 24, 1998

[54] COATING METHOD, COATING APPARATUS AND COATED PRODUCT

[75] Inventor: Toshifumi Ogasawara, Hiroshima-ken, Japan

[73] Assignee: Mazda Motor Corporation, Japan

[21] Appl. No.: 748,722

[22] Filed: Nov. 14, 1996

Related U.S. Application Data

[63] Continuation of Ser. No. 312,800, Sep. 27, 1994, abandoned.

[30] Foreign Application Priority Data

| | | | |
|---|---|---|---|
| Sep. 30, 1993 | [JP] | Japan | 5-268457 |
| Jun. 17, 1994 | [JP] | Japan | 6-135717 |

[51] Int. Cl.[6] .............. B05D 3/12; B05D 3/02; B05D 3/06; C08F 2/46

[52] U.S. Cl. .............. 427/346; 427/378; 427/379; 427/493; 427/542

[58] Field of Search .............. 427/379, 493, 427/425, 378, 380, 375, 508, 521, 542, 346

[56] References Cited

U.S. PATENT DOCUMENTS

| | | | |
|---|---|---|---|
| 1,948,091 | 2/1934 | Alvey et al. . | |
| 2,598,163 | 5/1952 | Halls . | |
| 2,658,008 | 11/1953 | Williams et al. . | |
| 4,125,677 | 11/1978 | Graetz et al. | 427/385.5 |
| 4,336,279 | 6/1982 | Metzger | 427/379 |
| 4,546,553 | 10/1985 | Best | 427/372.2 |
| 4,650,718 | 3/1987 | Simpson et al. | 427/410 |
| 4,874,639 | 10/1989 | Matsui et al. | 427/240 |
| 5,009,931 | 4/1991 | Yamane et al. | 427/425 |
| 5,104,682 | 4/1992 | Nakahama et al. | 427/425 |

FOREIGN PATENT DOCUMENTS

| | | |
|---|---|---|
| 3038382A | 4/1981 | Germany . |
| 4227885 | 8/1992 | Japan . |

*Primary Examiner*—Diana Dudash
*Attorney, Agent, or Firm*—Sixbey, Friedman, Leedom & Ferguson, P.C.; Gerald J. Ferguson, Jr.; Joan K. Lawrence

[57] ABSTRACT

A solvent-containing coating composition is applied to a work to a thickness larger than a running limit thickness and is subjected to a setting step of evaporating the solvent in the coating composition applied to the work and a hardening step of hardening the coating composition after the setting step while the work is rotated about a substantially horizontal axis after the coating step to prevent the coating composition on a vertical surface of the work from running or sagging. The coating composition is arranged so that the coating composition has a flowability and at the same time the solvent accounts for not more than 30% by weight of the coating composition at a time during the setting step or the end of the same.

7 Claims, 13 Drawing Sheets

COATING METHOD, COATING APPARATUS AND COATED PRODUCT

This application is a Continuation of Ser. No. 08/312,800, filed Sep. 27, 1994, now abandoned.

BACKGROUND OF THE INVENTION

1. Field of the Invention

This invention relates to a method of coating a work such as a vehicle body, an apparatus for carrying out the method and a product coated by the method, and more particularly to a rotational coating method in which a coating composition is applied to the surface of a work to a thickness larger than a limit thickness of running or sagging and the work is rotated about a substantially horizontal axis in order to prevent running or sagging of the coating composition, an apparatus for carrying out the method and a product coated by the method.

2. Related Art

It has been known that when a work such as a vehicle body is coated with a coating composition, the smoothness of the coating film surface can be improved by increasing the amount of coating composition to increase the thickness of the coating film.

That is, when a coating composition is applied to the surface of a work, the surface of the coating film tends to become smooth due to its surface tension which acts on the surface of coating film as a tensile force in a direction parallel to the surface of the coating film. The smoothening effect by the surface tension becomes better as the flowability of the coating composition increases. The flowability of the coating composition increases with increase in the amount of coating composition (the thickness of the coating film). Accordingly, when the amount of the coating composition is increased, the flowability of the coating composition increases and the smoothness of the coating film becomes better. Especially when the coating composition is applied to a thickness larger than a limit thickness of running or sagging, the surface of the coating film becomes excellently smooth. The "limit thickness of running or sagging" means a minimum thickness of the coating film over which running or sagging of the coating composition will occur and will be referred to simply as "the running limit thickness", hereinbelow.

When the coating composition is applied to a work having a surface extending substantially in a vertical direction to a thickness larger than the running limit thickness, sagging or running of the coating composition occurs in the vertical surface of the work under gravity, which greatly deteriorates the smoothness of the coating film.

However when the work is rotated about a horizontal axis after application of the coating composition, a force in a direction opposite to the gravity acts on the coating composition on the vertical surface and sagging or running of the coating composition can be prevented. Further a tensile force which acts on the coating composition in a direction parallel to the surface of the coating film is generated by the rotation of the work, and the tensile force is associated with the surface tension of the coating composition to further smoothen the surface of the coating film.

Recently, as disclosed for instance in U.S. Pat. No. 4,874,639, there has been proposed a method of coating which is called "rotational coating method" and in which a coating composition is applied to the surface of a work to a thickness larger than a running limit thickness and the work applied with the coating composition is rotated about a substantially horizontal axis to prevent running or sagging of the coating composition from a time before the coating composition begins to run or sag until the coating composition sets to such an extent that the coating composition cannot run or sag, thereby obtaining a sufficient thickness of coating film to improve smoothness of the coating film surface while preventing running or sagging of the coating composition.

However, our investigation has revealed that even if the coating composition is applied to a thickness larger than the running limit thickness and the work is rotated, an excellent smoothness of the coating film surface cannot be always obtained.

That is, when the surface to be coated has fine irregularities, the coating film surface sometimes can be excellently smooth without affected by the irregularities and sometimes irregularities appear on the coating film surface.

SUMMARY OF THE INVENTION

In view of the foregoing observations and description, the primary object of the present invention is to provide a rotational coating method in which the coating film surface can be excellently smooth without affected by irregularities on the surface to be coated.

Another object of the present invention is to provide a coating apparatus for carrying out the method.

Still another object of the present invention is to provide a coated product coated in accordance with the method.

Coating method in accordance with a first aspect of the present invention

The coating method in accordance with a first aspect of the present invention is an improvement in a method of coating comprising a coating step of applying a solvent-containing coating composition to a work, a setting step of evaporating the solvent in the coating composition applied to the work and a hardening step of hardening the coating composition after the setting step, the coating composition being applied to the work in the coating step to a thickness larger than a limit thickness over which the coating composition on a surface of the work extending in a vertical direction will normally run or sag during the setting step and the work being rotated about a substantially horizontal axis after the coating step to prevent the coating composition on the vertical surface of the work from running or sagging.

The coating method of the first aspect is characterized in that the coating composition is arranged so that the coating composition has a flowability and at the same time the solvent accounts for not more than 30% by weight of the coating composition at a time during the setting step or the end of the same. Preferably the percentage of the solvent is not more than 10%. In the setting step, the solvent may be evaporated at ordinary temperatures.

The coating composition may be, for instance, of a thermosetting type or of an ultraviolet curing type so long as it contains solvent. In the former case, the hardening step is a step of hardening the coating composition by heating and in the latter case, the hardening step is a step of hardening the coating composition by irradiation of ultraviolet rays.

When a solvent-containing thermosetting coating composition is employed as the coating composition and a heat-hardening step is employed as the hardening step, the coating composition may be applied to the work in the coating step to a thickness larger than a limit thickness over which the coating composition on a vertical surface of the work will normally run or sag during the setting step and the heat-hardening step. In this case, the work is rotated about a substantially horizontal axis during the setting step and the heat-hardening step to prevent the coating composition on the vertical surface of the work from running or sagging.

The coating step may be for forming the topcoating film. The work may be a vehicle body.

Coating method in accordance with a second aspect of the present invention

The coating method in accordance with a second aspect of the present invention is an improvement in a method of coating comprising a coating step of applying a solvent-containing thermosetting coating composition to a work and a heat-hardening step of hardening the coating composition by heating after the coating step, the coating composition being applied to the work in the coating step to a thickness larger than a limit thickness over which the coating composition on a surface of the work extending in a vertical direction will normally run or sag during the heat-hardening step and the work being rotated about a substantially horizontal axis after the coating step to prevent the coating composition on the vertical surface of the work from running or sagging.

The coating method of the second aspect is characterized in that the coating composition is arranged so that the coating composition has a flowability and at the same time the solvent accounts for not more than 30% by weight of the coating composition at a time during the heat-hardening step. Preferably the percentage of the solvent is not more than 10%.

A setting step of evaporating the solvent in the coating composition applied to the work may be provided between the coating step and the heat-hardening step. In this case, the coating composition may be applied to the work in the coating step to a thickness larger than a limit thickness over which the coating composition on a vertical surface of the work will normally run or sag during the setting step and the heat-hardening step and the work is rotated about a substantially horizontal axis during the setting step and the heat-hardening step to prevent the coating composition on the vertical surface of the work from running or sagging. In the setting step, the solvent may be evaporated at ordinary temperatures.

The coating step may be for forming the topcoating film. The work may be a vehicle body.

Coating method in accordance with a third aspect of the present invention

The coating method in accordance with a third aspect of the present invention is an improvement in a method of coating comprising a coating step of applying a thermosetting coating composition to a work and a heat-hardening step of hardening the coating composition by heating after the coating step, the heat-hardening step including a temperature-raising step of heating the coating composition to its reaction starting temperature and a reaction-hardening step of causing the coating composition to harden by holding the temperature of the coating composition not lower than the reaction starting temperature after the temperature-raising step, the coating composition being applied to the work in the coating step to a thickness larger than a limit thickness over which the coating composition on a surface of the work extending in a vertical direction will normally run or sag during the temperature-raising step and the work being rotated about a substantially horizontal axis after the coating step to prevent the coating composition on the vertical surface of the work from running or sagging.

The coating method of the third aspect is characterized in that said temperature-raising step includes a temperature holding step of holding the temperature of the coating composition at a predetermined temperature lower than the reaction starting temperature and higher than the ordinary temperatures for a predetermined time in the course of heating the coating composition to the reaction starting temperature. The work may be rotated about a substantially horizontal axis during the temperature-raising step and reaction-hardening step.

The thermosetting coating composition may contain solvent. In this case, the coating composition is preferably arranged so that the coating composition has a flowability and at the same time the solvent accounts for not more than 30% by weight of the coating composition at a time during the temperature-raising step or the end of the same. More preferably the percentage of the solvent is not more than 10%.

When a thermosetting coating composition containing therein solvent is used, a setting step of evaporating the solvent in the coating composition applied to the work may be provided between the coating step and the temperature-raising step. In this case, the coating composition may be applied to the work in the coating step to a thickness larger than a limit thickness over which the coating composition on a vertical surface of the work will normally run or sag during the setting step and the temperature-raising step and the work is rotated about a substantially horizontal axis during the setting step and the temperature-raising step to prevent the coating composition on the vertical surface of the work from running or sagging. The work may be rotated also in the reaction-hardening step for the same purpose. In the setting step, the solvent may be evaporated at ordinary temperatures.

Said predetermined temperature and the predetermined time depends upon each other. The predetermined time is preferably not shorter than one minute. The temperature-raising step may be carried out for instance by conveying the work through a divided heating-oven in which a plurality of heating zones respectively having temperature-controlable heat sources are arranged in a predetermined direction. Further the temperature-raising step may be carried out by use of far infrared rays.

The coating step may be for forming the topcoating film. The work may be a vehicle body.

Coating apparatus in accordance with a fourth aspect of the present invention

The coating apparatus in accordance with a fourth aspect of the present invention is an improvement in a coating apparatus comprising a coating means for applying a thermosetting coating composition to a work, a heat-hardening means for hardening the coating composition on the work by heating and a rotating means for rotating the work about a substantially horizontal axis, the heat-hardening means including a temperature-raising means for heating the coating composition to its reaction starting temperature and a reaction-hardening means for causing the coating composition to harden by holding the temperature of the coating composition not lower than the reaction starting temperature, the coating means applying the coating composition to the work to a thickness larger than a limit thickness over which the coating composition on a surface of the work extending in a vertical direction will normally run or sag during heating by the temperature-raising means and the rotating means rotating the work about said axis after the coating composition is applied to the work to prevent the coating composition on the vertical surface of the work from running or sagging.

The coating apparatus of the fourth aspect is characterized by having a heating control means which controls the temperature-raising means to effect temperature holding heating for holding the temperature of the coating composition at a predetermined temperature lower than the reaction starting temperature and higher than the ordinary temperatures for a predetermined time in the course of heating the coating composition to the reaction starting temperature. The rotating means may be arranged to rotate the work about said axis during the heating by the temperature-raising means and the reaction-hardening by reaction-hardening means.

The thermosetting coating composition may contain solvent. In this case, the heating control means is preferably arranged to control the temperature-raising means so that the coating composition has a flowability and at the same time the solvent accounts for not more than 30% by weight of the coating composition at a time during the heating by the temperature-raising means or the end of the same. More preferably the percentage of the solvent is not more than 10%.

When a thermosetting coating composition containing therein solvent is used, a setting means for carrying out setting for evaporating the solvent in the coating composition applied to the work before the heating by the temperature-raising means may be provided. In this case, the coating means preferably applies the coating composition to the work to a thickness larger than a limit thickness over which the coating composition on a vertical surface of the work will normally run or sag during the setting and the heating and the rotating means rotates the work about said axis during the setting and the heating to prevent the coating composition on the vertical surface of the work from running or sagging. The rotating means may rotate the work also in the reaction-hardening. The setting means may evaporate the solvent at ordinary temperatures.

Said predetermined time is preferably not shorter than one minute. The temperature-raising means may be for instance a divided heating-oven in which a plurality of heating zones respectively having temperature-controlable heat sources are arranged in a direction of movement of the work. The heating control means may change the number of the heating zones to be operated according to the rate of movement of the work through the divided heating-oven, or may change the predetermined temperature according to the rate of movement of the work through the divided heating-oven. The temperature-raising means may have far infrared ray irradiating means as the heat sources.

The coating composition applied by the coating means may be for forming the topcoating film. The work may be a vehicle body.

Coated product in accordance with a fifth aspect of the present invention

The coated product in accordance with a fifth aspect of the present invention is characterized by being coated with one of the coating methods in accordance with the first to third aspects of the present invention.

General description about the first to fifth aspects of the present invention

As the solvent described above, aqueous solvents may be used as well as volatile solvents or organic solvents.

In this specification, that the coating composition runs or sags means that the coating composition runs or sags 2 mm or more, and that the coating composition has a flowability means the state in which the coating composition can run or sag 1 mm or more. The reasons for these definitions will be described later. As can be understood from these definitions, when the coating composition is in a state where the coating composition can run or sag, it necessarily has a flowability.

That the coating composition on a vertical surface of the work will normally run or sag means that the coating composition on a vertical surface of the work will run or sag (2 mm or more) under the gravity if the vertical surface is kept vertical without being rotated. Said limit thickness over which the coating composition on a vertical surface of the work will normally run or sag means a minimum thickness at which the coating composition can run or sag and is substantially equivalent to aforesaid running limit thickness.

That the work is rotated about a substantially horizontal axis after the coating step to prevent the coating composition on the vertical surface of the work from running or sagging means that the work is rotated not permit the coating composition on the work to run or sag 2 mm or more and the work should be rotated at least from a time before the coating composition applied to the work runs or sags 2 mm to a time after which the coating composition runs or sags no more.

The work should be rotated as long as the coating composition can run or sag, preferably as long as the coating composition has a flowability (can run or sag 1 mm) and more preferably until the coating composition completely lose its flowability. More particularly running or sagging of the coating composition can occur during said setting step or the hardening step (especially during the heat-hardening step). Accordingly, when the coating composition is in such a state that running or sagging can occur during the setting step, the work should be rotated at least as long as the coating composition is in the state during the setting step, and when the coating composition is in such a state that running or sagging can occur during the hardening step, the work should be rotated at least as long as the coating composition is in the state during the hardening step, and when the coating composition is in such a state that running or sagging can occur during both the setting step and the hardening step, the work should be rotated at least as long as the coating composition is in the state during the setting step and the hardening step. The work may be kept rotated after the coating composition comes not to run or sag.

When the work applied with the coating composition is subjected to the heat-hardening step immediately after the coating step, the surface of the coating film is rapidly hardened with a large amount of the solvent remaining in the coating composition and when the solvent is subsequently released through the hardened surface film, holes can be generated in the surface of the coating film. In order to avoid this problem, the setting step is effected to evaporate the solvent to some extent before the hardening step especially before the heat-hardening step. When the solvent is an organic solvent (volatile solvent), the setting step may be a step of allowing the work to stand for a predetermined time at an ordinary temperature. When the solvent is an aqueous solvent, the setting step may be a step of allowing the work to stand for a predetermined time at a temperature higher than ordinary temperatures, for 5 to 7 minutes at 80° C. Though the setting step may be effected at an elevated temperature also in the case of an organic solvent, the elevated temperature generally should be not higher than 40° C.

Though the present invention is basically directed to rotational coating in which the coating composition is applied to the work to a thickness larger than the running limit thickness and the work is rotated to prevent running or sagging of the coating composition and is directed to coating of a work having a surface extending substantially in a vertical direction, the present invention can also be applied to coating a work having no surface extending substantially in a vertical direction.

Description about the first aspect of the present invention

The method in accordance with the first aspect of the present invention is based on the assumption that running or sagging of the coating composition can occur in the setting step irrespective of whether running or sagging of the coating composition can occur in the hardening step.

The coating composition may be of any type so long as it contains a solvent. For example, the coating composition may be of a thermosetting type which hardens when heated, of an ultraviolet curing type which hardens when exposed to ultraviolet rays or of other types which harden by other methods. The hardening step may depend upon the type of the coating composition used.

The coating composition used in the method of the first aspect of the present invention is typically a thermosetting coating composition containing therein a solvent. When typical thermosetting coating composition is heated, the solid component of the coating composition is once softened and the coating composition exhibits a high flowability and when further heated, the temperature of the coating composition exceeds its reaction starting temperature and the coating composition hardens by crosslinking reaction. Accordingly, at the end of the setting step, the coating composition is sometimes in such a state that running or sagging can occur (will be referred to simply as "the running state", hereinbelow) and sometimes in such a state that running or sagging cannot occur (will be referred to simply as "the non-running state", hereinbelow) no more due to evaporation of the solvent when the coating composition is applied to the work in the coating step to a thickness larger than the limit thickness. In either case, the solid component of the coating composition softened early in the heat-hardening step and the flowability of the coating composition can increase to such an extent that running or sagging can occur.

In the method of the first aspect, the coating composition need not be in the running state in the hardening step, but the coating composition may be of a type which hardens as soon as subjected to the hardening step. For example, ultraviolet curing coating compositions hardens as soon as exposed to ultraviolet rays and in some thermosetting coating compositions, the temperature of the coating composition immediately reaches to the reaction starting temperature when heated and the coating composition hardens soon without softening.

As can be understood from the description above, in the method of the first aspect, the coating composition is in the running state at least in the setting step, and accordingly the work should be rotated at least in the setting step. When the coating composition is in the running state also in the hardening step, the work then should be rotated also in the hardening step. When the coating composition is in the non-running state in the hardening step, the work need not be rotated in the hardening step though may be rotated.

Description about the second aspect of the present invention

The method in accordance with the second aspect of the present invention is based on the assumption that a thermosetting coating composition is used and running or sagging of the coating composition can occur in the heat-hardening step. The setting step may be effected though not necessary. When the setting step is effected, the coating composition may be either in the running state or the non-running state in the setting step. Any of the thermosetting coating compositions may be used so long as it can be in the running state in the heat-hardening step. Typically thermosetting coating compositions which once soften when heated are used but those which does not soften may be used.

As can be understood from the description above, in the method of the second aspect, the coating composition is in the running state at least in the heat-hardening step, and accordingly the work should be rotated at least in the heat-hardening step. When the setting step is effected and the coating composition is in the running state also in the setting step, the work then should be rotated also in the setting step. When the coating composition is in the non-running state in the setting step, the work need not be rotated in the setting step though may be rotated.

Description about the third aspect of the present invention

The method in accordance with the third aspect of the present invention is based on the assumption that a thermosetting coating composition is used with the heat-hardening step including said temperature-raising step and the reaction-hardening step and running or sagging of the coating composition can occur in the temperature-raising step and said temperature holding is effected in the temperature-raising step. The setting step may be effected though not necessary. When the setting step is effected, the coating composition may be either in the running state or the non-running state in the setting step. Any of the thermosetting coating compositions may be used so long as it can be in the running state in the temperature-raising step. Typically thermosetting coating compositions which once soften when heated are used but those which does not soften may be used.

As can be understood from the description above, in the method of the third aspect, the coating composition is in the running state at least in the temperature-raising step, and accordingly the work should be rotated at least in the temperature-raising step. When the setting step is effected and the coating composition is in the running state also in the setting step, the work then should be rotated also in the setting step. When the coating composition is in the non-running state in the setting step, the work need not be rotated in the setting step though may be rotated. In either case, the work may be rotated also in the reaction-hardening step.

Description about the fourth aspect of the present invention

The apparatus in accordance with the fourth aspect of the present invention is for carrying out the method of the third aspect.

Surface-smoothening effect of the rotational coating

As described above, when the coating composition is applied to the work to a thickness larger than the running limit thickness and the work is rotated about a horizontal axis, the coating film surface can be made excellently smooth without fear of the coating composition running or sagging.

Influence of irregularities on the surface to be coated

However, even by such rotational coating, an excellent smoothness of the coating film surface cannot be always obtained. That is, our investigation has revealed that even if the coating film surface is sufficiently smooth at the time when the coating composition loses its flowability, the smoothness subsequently deteriorates when the solvent evaporates in a large amount after the coating composition loses its flowability. That is, when a large amount of solvent evaporates after the coating composition loses its flowability, the coating film shrinks by a large amount. When shrinkage of the coating film is large, the smoothness of the coating film is greatly affected by irregularities on the surface to be coated and the influence of the irregularities appears on the coating film surface. When shrinkage of the coating film is small, the influence of the irregularities hardly appears on the coating film surface.

More particularly, we found a fact that the smaller the shrinkage of the coating film after the coating composition loses its flowability due to evaporation of the solvent, reduction in viscosity of the solid component, and the like is, the less influence of the irregularities of the surface to be coated appears on the coating film surface, and the shrinkage of the coating film can be substantially determined by the amount of the solvent contained in the coating composition at the time the coating composition loses its flowability. When the amount of the solvent contained in the coating composition at the time the coating composition loses its flowability is not more than 30% by weight, influence of the irregularities on the surface to be coated can be avoided and the smoothness of the coating film surface can be better than that obtained by the conventional rotational coating. Further better smoothness of the coating film surface can be obtained when the amount of the solvent contained in the coating composition at the time the coating composition lose its flowability is not more than 10% by weight.

That is, as the shrinkage of the coating film after the coating composition loses its flowability increases, influence of the irregularities on the surface to be coated more appears on the coating film and vice versa. When influence of the irregularities once appears on the coating film after the coating composition lose its flowability, the irregularities on the coating film cannot be removed even if the work is continued to be rotated since the coating composition has lost its flowability.

The present invention is made based on our discovery described above and is to prevent influence of the irregularities on the surface to be coated from appearing on the coating film surface and to keep smoothness of the coating film surface (obtained by virtue of the rotational coating) by reducing shrinkage of the coating film after the coating composition loses its flowability to such an extent that influence of the irregularities on the surface to be coated will not appear, that is, by reducing the amount of the solvent contained in the coating composition at the time the coating composition loses its flowability to not more than 30% by weight.

In order to obtain a sufficient smoothness of the coating film surface without being affected by the irregularities on the surface to be coated, it is necessary that the coating composition loses its flowability in a state where the coating film surface is given a sufficient smoothness by virtue of the rotational coating and the solvent accounts for not more than 30% by weight (preferably not more than 10% by weight) of the coating composition at the time the coating composition loses its flowability.

Since the rotational coating is to obtain a sufficient smoothness of the coating film surface by rotating the work until the coating composition sets at least to such an extent that the coating composition cannot run or sag, the coating film surface necessarily has a sufficient smoothness at the time the coating composition loses its flowability irrespective whether the coating composition loses its flowability during rotation of the work or after rotation of the work is ended. Even if the coating composition has a flowability at the end of rotation, the flowability of the coating composition is very small and the coating composition cannot run or sag more than 2 mm. Accordingly, the smoothness of the coating film surface obtained by rotation of the work can be kept until the coating composition loses its flowability.

Thus, in the rotational coating, when the coating composition has a flowability and at the same time the solvent accounts for not more than 30% or 10% by weight of the coating composition at a time during rotation of the work, the solvent necessarily accounts for not more than 30% or 10% by weight of the coating composition and the coating film surface necessarily has a sufficient smoothness at the time the coating composition loses its flowability. Accordingly that the coating composition has a flowability and at the same time the solvent accounts for not more than 30% or 10% by weight of the coating composition at a time during rotation of the work is substantially equivalent to that the coating composition loses its flowability in a state where the coating film surface has a sufficient smoothness and the solvent accounts for not more than 30% or 10% by weight of the coating composition at the time the coating composition loses its flowability.

As described above, in this specification, that the coating composition runs or sags is defined to mean that the coating composition runs or sags 2 mm or more, and that the coating composition has a flowability is defined to mean the state in which the coating composition can run or sag 1 mm or more.

To apply the coating composition to a thickness larger than the limit thickness over which the coating composition will normally run or sag is to provide a sufficient flowability to the coating composition so that a sufficient smoothness of the coating film surface can be obtained when the work is rotated, and in order to obtain a sufficient smoothness of the coating film surface, such a flowability that the coating composition can run or sag at least 2 mm is necessary.

When the coating film shrinks by a large amount and influence of the irregularities once appears on the coating film after the coating composition lose its flowability, the irregularities on the coating film cannot be removed since the coating composition has lost its flowability and the "self-smoothening ability" due to the surface tension. Accordingly the solvent must be reduced, while the coating composition has a flowability sufficient to exhibit the self-smoothening ability, to such an extent that the influence of the irregularities on the surface to be coated cannot appear on the coating film surface even if the coating film shrinks (i.e., not more than 30% by weight and preferably not more than 10% by weight). In order to ensure the self-smoothening ability, the flowability need not be so high as that at which the coating composition can run or sag 2 mm or more but may of such a value that the coating composition can run or sag 1 mm or more.

The coating method of the first aspect

In the method of the first aspect, the setting step is carried out and the coating composition is applied to the work in the coating step so that running or sagging of the coating composition can occur at least in the setting step.

In this case, when the coating composition has a flowability and at the same time the solvent accounts for not more than 30% by weight of the coating composition at a time during the setting step or the end of the same, the solvent necessarily accounts for not more than 30% by weight of the coating composition and the coating film surface necessarily has a sufficient smoothness at the time the coating composition loses its flowability in the remaining setting step or in the hardening step. Accordingly even if the solvent remaining in the coating composition at the time the coating composition loses it flowability subsequently evaporates and shrinkage of the coating film occurs, the shrinkage is too small for influence of the irregularities on the surface to be coated to appear on the coating film surface, whereby an excellent smoothness of the coating film surface can be obtained.

Thus in the method of the first aspect of the present invention, where the coating composition is applied to the work in the coating step to a thickness larger than a limit thickness over which the coating composition on a surface of the work extending in a vertical direction will normally run or sag during the setting step, and the work is rotated about a substantially horizontal axis after the coating step to prevent the coating composition on the vertical surface of the work from running or sagging, and the coating composition is arranged so that the coating composition has a flowability and at the same time the solvent accounts for not more than 30% by weight of the coating composition at a time during the setting step or the end of the same, an excellent smoothness of the coating film surface can be obtained less affected by the irregularities on the surface to be coated.

When the percentage of the solvent is not more than 10%, a more excellent smoothness of the coating film surface can be obtained less affected by the irregularities on the surface to be coated.

When a solvent-containing thermosetting coating composition is employed as the coating composition and a heat-hardening step is employed as the hardening step, the coating composition may be applied to the work in the coating step to a thickness larger than a limit thickness over which the coating composition on a vertical surface of the work will normally run or sag during the setting step and the heat-hardening step and the work may be rotated about a substantially horizontal axis during the setting step and the heat-hardening step to prevent the coating composition on the vertical surface of the work from running or sagging. In this case, by arranging the coating composition so that the coating composition has a flowability and at the same time the solvent accounts for not more than 30% by weight of the coating composition at a time during the heat-hardening step, an excellent smoothness of the coating film surface can also be obtained less affected by the irregularities on the surface to be coated. However, even if the coating composition has a flowability also in the heat-hardening step, an excellent smoothness of the coating film surface can be obtained less affected by the irregularities on the surface to be coated irrespective of the state of the coating composition in the heat-hardening step by arranging the coating composition so that the coating composition has a flowability and at the same time the solvent accounts for not more than 30% by weight of the coating composition at a time during the setting step.

When an ultraviolet-curing coating composition containing therein a solvent is used as the coating composition, the coating composition must be arranged so that the coating composition has a flowability and at the same time the solvent accounts for not more than 30% by weight of the coating composition at a time during the setting step since the ultraviolet-curing coating composition loses its flowability and hardens as soon as exposed to ultraviolet rays.

The coating method of the second aspect

In the method of the second aspect, the coating composition is applied to the work in the coating step so that running or sagging of the coating composition can occur at least in the heat-hardening step.

In this case, when the coating composition has a flowability and at the same time the solvent accounts for not more than 30% by weight of the coating composition at a time during the heat-hardening step, the solvent necessarily accounts for not more than 30% by weight of the coating composition and the coating film surface necessarily has a sufficient smoothness at the time the coating composition loses its flowability in the remaining heat-hardening step. Accordingly even if the solvent remaining in the coating composition at the time the coating composition loses it flowability subsequently evaporates and shrinkage of the coating film occurs, the shrinkage is too small for influence of the irregularities on the surface to be coated to appear on the coating film surface, whereby an excellent smoothness of the coating film surface can be obtained.

Thus in the method of the second aspect of the present invention, where the coating composition is applied to the work in the coating step to a thickness larger than a limit thickness over which the coating composition on a surface of the work extending in a vertical direction will normally run or sag during the heat-hardening step, and the work is rotated about a substantially horizontal axis after the coating step to prevent the coating composition on the vertical surface of the work from running or sagging, and the coating composition is arranged so that the coating composition has a flowability and at the same time the solvent accounts for not more than 30% by weight of the coating composition at a time during the heat-hardening step, an excellent smoothness of the coating film surface can be obtained less affected by the irregularities on the surface to be coated.

When the percentage of the solvent is not more than 10%, a more excellent smoothness of the coating film surface can be obtained less affected by the irregularities on the surface to be coated.

When a setting step is carried out, the coating composition may be applied to the work in the coating step to a thickness larger than a limit thickness over which the coating composition on a vertical surface of the work will normally run or sag during the setting step and the heat-hardening step and the work may be rotated about a substantially horizontal axis during the setting step and the heat-hardening step to prevent the coating composition on the vertical surface of the work from running or sagging. In this case, an excellent smoothness of the coating film surface can be obtained less affected by the irregularities on the surface to be coated irrespective of the state of the coating composition in the setting step by arranging the coating composition so that the coating composition has a flowability and at the same time the solvent accounts for not more than 30% by weight of the coating composition at a time during the heat-hardening step.

The coating method of the third aspect

In the method of the third aspect, the heat-hardening step includes a temperature-raising step and a reaction-hardening step, and the coating composition is applied to the work in the coating step so that running or sagging of the coating composition can occur at least in the temperature-raising step.

In this case, when the temperature-raising step includes a temperature holding step of holding the temperature of the coating composition at a predetermined temperature lower than the reaction starting temperature and higher than the ordinary temperatures for a predetermined time in the course of heating the coating composition to the reaction starting temperature (the temperature at which the coating composition begins reaction of hardening), a state where the coating composition has a higher flowability can be ensured for the predetermined time unlike the ordinary heat-hardening step where the temperature of the coating composition is linearly increased to the reaction starting temperature. When the coating composition has a higher flowability, smoothening of the coating film surface by the surface tension and the rotation of the work is further promoted and when the state is held for the predetermined time, a very excellent smoothness of the coating film surface can be obtained less affected by the irregularities on the surface to be coated.

Thus in the method of the third aspect where the heat-hardening step includes a temperature-raising step of heating the coating composition to its reaction starting temperature and a reaction-hardening step of causing the coating composition to harden by holding the temperature of the coating composition not lower than the reaction starting temperature, the coating composition is applied to the work in the coating step to a thickness larger than a limit thickness over which the coating composition on a surface of the work extending in a vertical direction will normally run or sag during the temperature-raising step, the work is rotated about a substantially horizontal axis after the coating step to prevent the coating composition on the vertical surface of the work from running or sagging and the temperature-raising step including a temperature holding step of holding the temperature of the coating composition at a predetermined temperature lower than the reaction starting temperature and higher than the ordinary temperatures for a predetermined time in the course of heating the coating composition to the reaction starting temperature, smoothening of the coating film surface is further promoted by virtue of the temperature holding step and a very excellent smoothness of the coating film surface can be obtained less affected by the irregularities on the surface to be coated.

When a solvent-containing thermosetting coating composition is employed as the coating composition, an excellent smoothness of the coating film surface can be obtained less affected by the irregularities on the surface to be coated by arranging the coating composition so that the coating composition has a flowability and at the same time the solvent accounts for not more than 30% by weight of the coating composition at a time during the temperature-raising step or the end of the same.

Especially when the temperature holding step of holding the temperature of the coating composition at a predetermined temperature lower than the reaction starting temperature and higher than the ordinary temperatures for a predetermined time in the course of heating the coating composition to the reaction starting temperature is effected, more solvent can be evaporated while holding the flowability of the coating composition, whereby the amount of the solvent contained in the coating composition at the time the coating composition loses its flowability as compared with the ordinary heat-hardening step where the temperature of the coating composition is linearly increased to the reaction starting temperature and a very excellent smoothness of the coating film surface can be obtained hardly affected by the irregularities on the surface to be coated. More particularly, in the ordinary heat-hardening step, the temperature in the heating oven is set not lower than the reaction starting temperature of the coating composition and the temperature of the coating composition increases at a rate depending on the heat capacity of the work. When the temperature of the coating composition increases in such a manner, the temperature of the coating composition reaches to the reaction starting temperature in a short time and the viscosity of the coating composition increases (the flowability lowers) due to reaction-hardening. Accordingly, it is difficult to reduce the amount of the solvent not lower than 10% by weight while keeping the flowability. To the contrast, when the temperature holding step is carried out, a sufficient amount of solvent can be evaporated without permitting the coating composition to reaction-harden, whereby the amount of the solvent can be easily reduced not lower than 10% by weight while keeping the flowability and a very excellent smoothness which cannot be obtained but the temperature holding step can be obtained.

When the solvent is to be reduced to a given level, the purpose can be accomplished in a shorter time by effecting the temperature holding step, whereby the time required for the heat-hardening step can be shortened.

When a thermosetting coating composition containing therein solvent is used, a setting step of evaporating the solvent in the coating composition applied to the work may be provided between the coating step and the temperature-raising step, the coating composition may be applied to the work in the coating step to a thickness larger than a limit thickness over which the coating composition on a vertical surface of the work will normally run or sag during the setting step and the temperature-raising step, and the work may be rotated about a substantially horizontal axis during the setting step and the temperature-raising step (and the reaction-hardening step if necessary) to prevent the coating composition on the vertical surface of the work from running or sagging. When the setting step is effected before the temperature-raising step, a certain amount of solvent can be evaporated in the setting step and accordingly the amount of the solvent remaining in the coating composition at the time the coating composition loses its flowability can be further reduced.

The predetermined temperature can be set according to the predetermined time, and the predetermined time can be set according to the predetermined temperature. By changing the predetermined time and the predetermined temperature in relation to each other, even if, for instance, the conveying rate of the work through the heating oven is changed, the change in the rate can be easily dealt with to keep a proper temperature holding step. When the predetermined time is not shorter than one minute, the effect of temperature holding step can be made excellent.

When the temperature-raising step is carried out by conveying the work through a divided heating-oven in which a plurality of heating zones respectively having temperature-controlable heat sources are arranged in a predetermined direction, the change in the conveying rate of the work can be easily dealt with by simply changing the number of the heating zones to be actually operated. Further when the temperature-raising step is carried out by use of far infrared rays, the temperature of the coating composition can be quickly raised to the predetermined temperature and the time required for the heat-hardening step can be shortened.

The coating apparatus of the fourth aspect

The apparatus of the fourth aspect is for carrying out the method of the third aspect and the operation and the result are substantially the same as those of the method of the third aspect.

DESCRIPTION OF THE PREFERRED EMBODIMENT

An embodiment of the present invention where the present invention is applied to coating of a vehicle body will be described with reference to the drawings, hereinbelow.

Coating of a vehicle body

Figure 1:
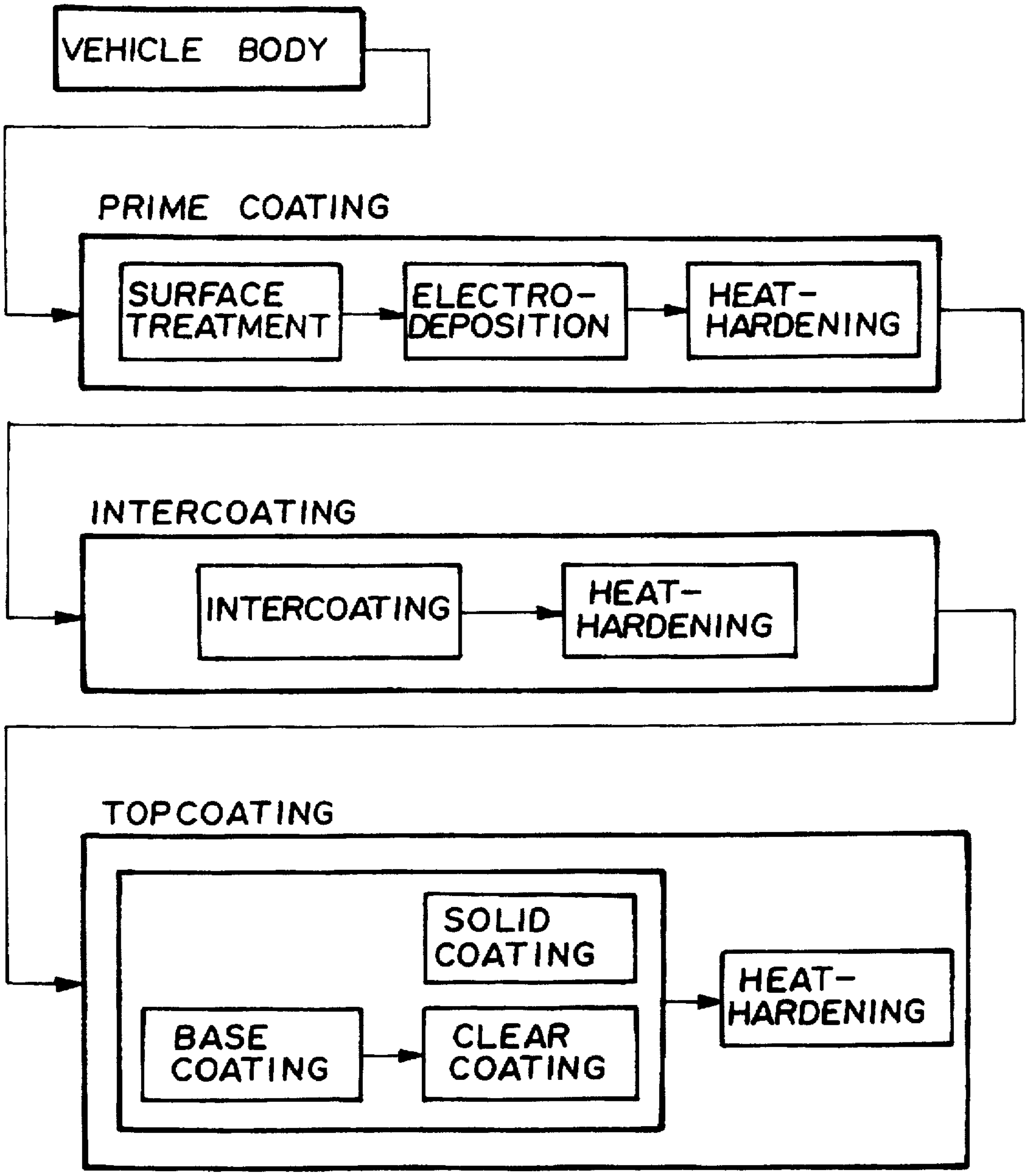
FIG. 1 is a flow chart for briefly illustrating the procedure of coating.

An example of coating of a vehicle body will be described with reference to FIG. 1. As shown in FIG. 1, generally the vehicle body is coated with a prime-coating, an intercoating and a topcoating in this order.

In the prime-coating step, the vehicle body is first subjected to a surface treatment. In the surface treatment, the vehicle body is degreased and then film of zinc phosphate is formed on the vehicle body surface in order to improve bonding strength of coating composition to the vehicle body. Then film of an epoxy coating composition is formed on the film of zinc phosphate by electro-deposition and is hardened by heating.

In the intercoating step, film of a polyester coating composition is formed and hardened by heating.

In the topcoating step, the vehicle body is applied with a solid coating or with a base-clear coating. When the vehicle body is applied with the solid coating, the solid coating film forms the topcoating film. The solid coating composition is first applied to the vehicle body and then hardened by heating. When the vehicle body is applied with the base-clear coating, a base coating composition, for instance, of acrylic resin is first applied to the vehicle body and then a clear coating composition, for instance, of acrylic resin is applied on the base coating composition layer. Thereafter the base coating composition and the clear coating composition are hardened by heating. Combinations of the base coating composition and the clear coating composition include a base coating composition containing therein lustering material such as aluminum or mica and a colorless clear coating composition; a base coating composition containing therein lustering material such as aluminum or mica and a colored clear coating composition; a base coating composition containing therein no lustering material and a colorless clear coating composition; and a base coating composition containing therein no lustering material and a colored clear coating composition. In the base-clear coating, application of the base coating composition and heat-hardening thereof correspond to a base coating step and application of the clear coating composition and heat-hardening thereof correspond to a clear coating step.

The coating the vehicle body described above is only an example, and for example, the intercoating step and/or the clear coating step may be effected twice. Further in the prime-coating step and/or the intercoating step, other various treatments such as sealing treatment, a treatment for improving resistance to chipping and the like may be effected.

Rotational coating

Rotational coating is effected to obtain an excellent smoothness of the coating film surface. The rotational coating can be applied to any coating so long as smoothness of the coating film surface is required. For example, in the case of coating of the vehicle body, the rotational coating can be applied to the intercoating step and the topcoating step. The rotational coating can be suitably applied to the solid coating step and the clear coating step.

Figure 2:
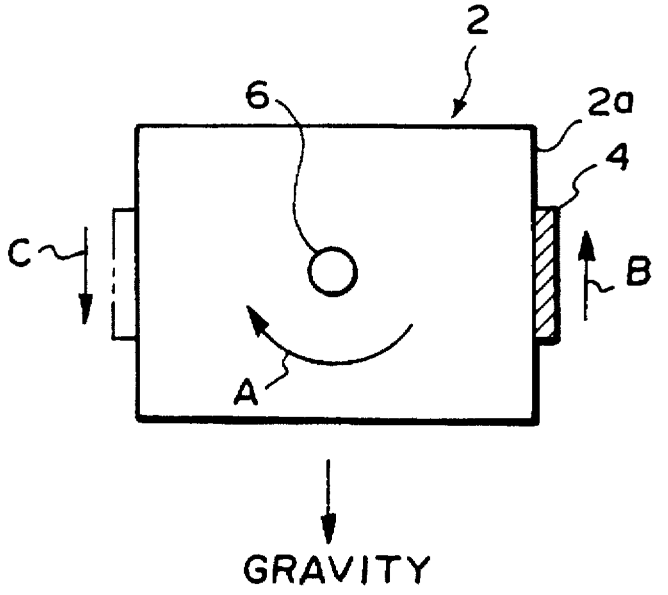
FIG. 2 is a schematic view for illustrating rotation of work to prevent running or sagging of the coating composition.

In the rotational coating, as shown in FIG. 2, a coating composition 4 is applied to a work 2 to a thickness larger than a limit thickness (running limit thickness) over which the coating composition on a surface 2*a* of the work 2 extending in a vertical direction will normally run or sag and the work 2 is rotated about a substantially horizontal axis 6 after the coating step to prevent the coating composition 4 on the vertical surface 2*a* of the work 2 from running or sagging.

Figure 3A:
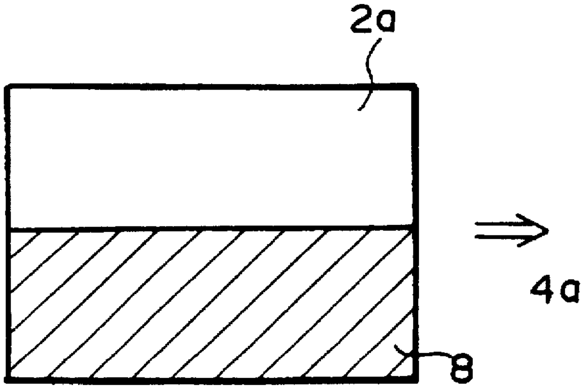
FIGS. 3A and 3B are schematic views for illustrating measurement of running or sagging of the coating composition.
Figure 3B:
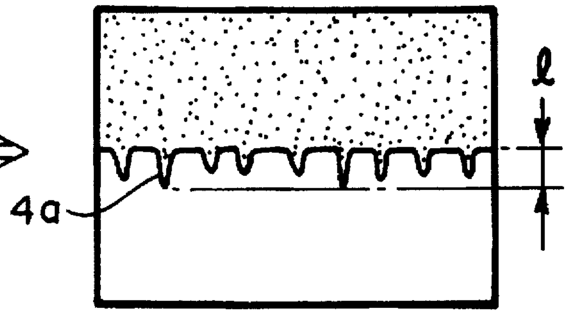

That the coating composition 4 on the vertical surface 2*a* of the work 2 will normally run or sag means that the coating composition 4 on the vertical surface 2*a* will run or sag under the gravity if the vertical surface is kept vertical without being rotated. As described before, in this specification, that the coating composition runs or sags means that the coating composition runs or sags 2 mm or more. When the coating composition runs or sags 2 mm or more, unacceptable irregularities are formed on the coating film surface. More particularly, after masking the lower half of the vertical surface 2 by a masking tape as shown in FIG. 3A, the coating composition is applied to the surface 2*a* and the tape 8 is removed as shown in FIG. 3B. After permitting the work to stand until running or sagging of the coating composition enlarges no more and the length l of the running (or sagging) 4*a* is measured. When the length l is not shorter than 2 mm, it is determined that running or sagging is occurred. Accordingly, the running limit thickness can be known by repeating measurement of running or sagging in a predetermined setting atmosphere or a predetermined heating atmosphere while gradually increasing the coating thickness and determining the coating thickness at the time the length l becomes not smaller than 2 mm.

The running or sagging of the coating composition is a phenomenon that the coating composition having a flowability runs downward under the gravity. Accordingly, as shown in FIG. 2, when the work 2 is rotated about a substantially horizontal axis 6, a force in the same direction as the gravity and a force opposite to the gravity alternately act on the coating composition, whereby running or sagging of the coating composition is prevented. That is, when the work 2 is continuously rotated in the direction of arrow A in FIG. 2, an inertia force directed toward the direction of arrow B opposite to the gravity acts on the surface 2*a* when the coating composition 4 on the surface 2*a* is in the right side as seen in FIG. 2, and an inertia force directed toward the direction of arrow C the same as the gravity acts on the surface 2*a* when the coating composition 4 on the surface 2*a* is in the left side. Thus a force in the same direction as the gravity and a force opposite to the gravity alternately act on the coating composition 4 by rotation of the work 2, whereby running or sagging of the coating composition in one direction is prevented. The work 2 need not be continuously rotated in one direction, but may be rotated by a predetermined angle (e.g., 360°, 45°, 90°, 135°) alternately in one direction and the other.

Rotation of the work should be started before the coating composition begins to run or sag under gravity after the coating composition is applied to the work and should be continued until the flowability of the coating composition lowers to such an extent that the coating composition cannot run or sag under gravity. Further the work should be rotated at a rate at which running or sagging of the coating composition can be prevented, e.g., at a rate higher than the rate at which the coating composition runs or sags under gravity, and at which running or sagging of the coating composition under centrifugal force cannot be generated. When the work has a surface to be coated which extends radially from the axis 6, the coating composition on the surface can run or sag under centrifugal force generated by rotation of the work.

Variations of the rotational coating

Basically, the rotational coating includes a coating step of applying a coating composition to a surface of a work and a hardening step of hardening the coating composition applied to the surface. When the coating composition contains therein a solvent, a setting step of evaporating the solvent may be effected between the coating step and the hardening.

Running and sagging of the coating composition can occur at least in one of the setting step and the hardening step. In the rotational coating, in order to obtain an excellent smoothness of the coating film surface, the coating composition must be applied to the work in the coating step to a thickness larger than a limit thickness over which the coating composition on a surface of the work extending in a vertical direction will normally run or sag during the setting step and/or the hardening step. That is, when the setting step is not effected, the coating composition must be applied to the work in the coating step to a thickness larger than a limit thickness over which the coating composition on a surface of the work extending in a vertical direction will normally run or sag during the setting step so that the coating composition becomes the aforesaid running state in the hardening step. On the other hand, when the setting step is effected, the coating composition must be applied to the work in the coating step to a thickness larger than a limit thickness over which the coating composition on a surface of the work extending in a vertical direction will normally run or sag during the setting step or during the hardening step or during both the setting step and the hardening step so that the coating composition becomes the aforesaid running state in the setting step or in the hardening step or in both the setting step and the hardening step.

In any of the cases described above, the work is rotated about a substantially horizontal axis to prevent running or sagging of the coating composition.

Smoothening of the coating film surface by the rotational coating

Figure 4:
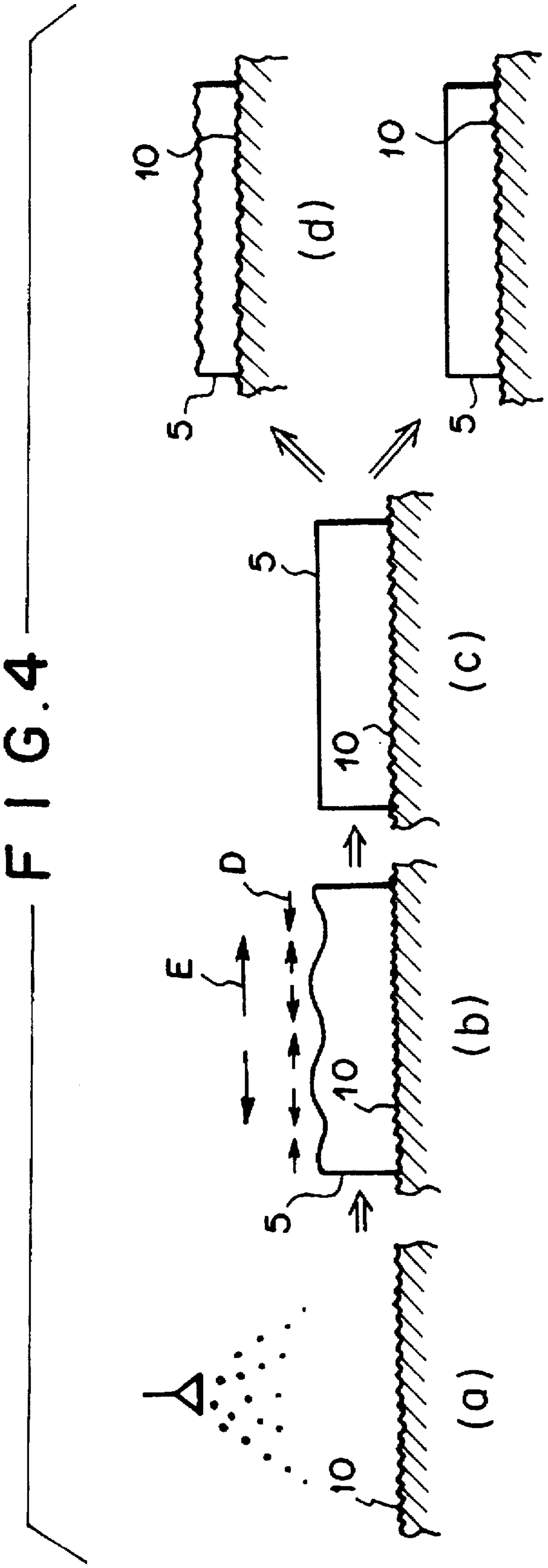
FIG. 4 is a schematic view for illustrating appearance of influence of irregularities on the surface to be coated.

The coating composition is, for instance, sprayed onto a surface 10 to be coated as shown at (a) in FIG. 4. The surface 10 to be coated may be a surface of a work itself or the surface of another coating film which has been applied to the surface. For example, when an intercoating is to be applied to the surface 10, the surface 10 may be the surface of a prime-coating, and when a solid coating is to be applied to the surface 10, the surface 10 may be the surface of an intercoating, and when a clear coating is to be applied to the surface 10, the surface 10 may be the surface of a base coating.

As shown at (b) in FIG. 4, when the coating composition is applied to a certain thickness, the coating film surface 5 is pulled in directions of arrow D parallel to the coating film surface 5 under surface tension and tends to be smooth. When the coating thickness is small, the flowability of the coating composition is poor and a sufficient smoothening effect by the surface tension cannot be obtained. However, when the coating composition is applied to a thickness larger than the running limit thickness, a sufficient smoothening effect by the surface tension can be obtained and the coating film surface 5 can be made excellently smooth.

However when the coating composition is applied to a surface substantially extending in a vertical direction to a thickness larger than the running limit thickness, the coating composition runs or sags on the surface under gravity and smoothness of the coating film surface is greatly deteriorated.

As described above, when the work is rotated about a substantially horizontal axis, a force in the same direction as the gravity and a force opposite to the gravity alternately act on the coating composition, whereby running or sagging of the coating composition is prevented. Further by rotation of the work, forces acting of the coating composition in directions of arrows E parallel to the coating film surface is generated and the smoothening effect by the surface tension is enhanced, whereby more excellent smoothness of the coating film surface can be obtained as shown at (c) in FIG. 4.

That is, when the coating composition is applied to the work to a thickness larger than the running limit thickness and the work is rotated about a horizontal axis, the coating film surface can be made excellently smooth by virtue of the surface tension together with the forces generated by the rotation of the work without fear of the coating composition running or sagging.

Influence of irregularities on the surface to be coated (influence of the amount of the solvent and irregularities on the surface to be coated)

However, when the coating composition contains solvent, even if the coating film surface is sufficiently smooth as shown at (c) in FIG. 4, the smoothness subsequently deteriorates when the solvent evaporates in a large amount after the coating composition loses its flowability. That is, when a large amount of solvent evaporates after the coating composition loses its flowability, the coating film shrinks by a large amount. When shrinkage of the coating film is large, the smoothness of the coating film is greatly affected by irregularities on the surface 10 to be coated and the influence of the irregularities appears on the coating film surface as shown at (d) in FIG. 4. When shrinkage of the coating film is small, the influence of the irregularities hardly appears on the coating film surface as shown at (e) in FIG. 4.

More particularly, the smaller the shrinkage of the coating film after the coating composition loses its flowability due to evaporation of the solvent, reduction in viscosity of the solid component, and the like is, the less influence of the irregularities of the surface to be coated appears on the coating film surface, and the shrinkage of the coating film can be substantially determined by the amount of the solvent contained in the coating composition. When the amount of the solvent contained in the coating composition at the time the coating composition loses its flowability is not more than 30% by weight, influence of the irregularities on the surface to be coated can be avoided and the smoothness of the coating film surface can be better than that obtained by the conventional rotational coating. Further better smoothness of the coating film surface can be obtained when the amount of the solvent contained in the coating composition at the time the coating composition loses its flowability is not more than 10% by weight.

In this specification, that the coating composition has a flowability is defined to mean that the coating composition has a flowability sufficient for the coating film surface to be smoothened by the surface tension and the like, and when the coating composition is in a state where the coating composition can run or sag 1 mm or more, it is said that the coating composition has a flowability. On the other hand, when the coating composition is in a state where the coating composition can run or sag only less than 1 mm, it is said that the coating composition has no flowability or lost its flowability.

(temperature holding step and influence of the irregularities on the surface to be coated)

When a thermosetting coating composition is used as the coating composition and is applied to the work to a thickness larger than a limit thickness over which the coating composition on a surface of the work extending in a vertical direction will normally run or sag during the heat-hardening step and the work is rotated about a substantially horizontal axis to prevent the coating composition on the vertical surface of the work from running or sagging during the heat-hardening step, a very excellent smoothness of the coating film surface can be obtained in the heat-hardening step as described above. In this case, when the heat-hardening step includes a temperature-raising step of heating the coating composition to its reaction starting temperature and a reaction-hardening step of causing the coating composition to harden by holding the temperature of the coating composition not lower than the reaction starting temperature, and the temperature-raising step includes a temperature holding step of holding the temperature of the coating composition at a predetermined temperature lower than the reaction starting temperature and higher than the ordinary temperatures for a predetermined time in the course of heating the coating composition to the reaction starting temperature), a state where the coating composition has a higher flowability can be ensured for the predetermined time unlike the ordinary heat-hardening step where the temperature of the coating composition is linearly increased to the reaction starting temperature. When the coating composition has a higher flowability, smoothening of the coating film surface by the surface tension and the rotation of the work is further promoted and when the state is held for the predetermined time, a very excellent smoothness of the coating film surface can be obtained less affected by the irregularities on the surface to be coated.

When a solvent-containing thermosetting coating composition is employed as the coating composition, an excellent smoothness of the coating film surface can be obtained less affected by the irregularities on the surface to be coated by arranging the coating composition so that the coating composition has a flowability and at the same time the solvent accounts for not more than 30% (preferably 10%) by weight of the coating composition at a time during the temperature-raising step or the end of the same.

Especially when the temperature holding step of holding the temperature of the coating composition at a predetermined temperature lower than the reaction starting temperature and higher than the ordinary temperatures for a predetermined time is effected, more solvent can be evaporated while holding the flowability of the coating composition, whereby the amount of the solvent contained in the coating composition at the time the coating composition loses its flowability as compared with the ordinary heat-hardening step where the temperature of the coating composition is linearly increased to the reaction starting temperature and a very excellent smoothness of the coating film surface can be obtained hardly affected by the irregularities on the surface to be coated. More particularly, in the ordinary heat-hardening step, the temperature in the heating oven is set not lower than the reaction starting temperature of the coating composition and the temperature of the coating composition increases at a rate depending on the heat capacity of the work. When the temperature of the coating composition increases in such a manner, the temperature of the coating composition reaches to the reaction starting temperature in a short time and the viscosity of the coating composition increases (the flowability lowers) due to reaction-hardening. Accordingly it is difficult to reduce the amount of the solvent not lower than 10% by weight while keeping the flowability. To the contrast, when the temperature holding step is carried out, a sufficient amount of solvent can be evaporated without permitting the coating composition to reaction-harden, whereby the amount of the solvent can be easily reduced not lower than 10% by weight while keeping the flowability and a very excellent smoothness which cannot be obtained but the temperature holding step can be obtained.

When the solvent is to be reduced to a given level, the purpose can be accomplished in a shorter time by effecting the temperature holding step, whereby the time required for the heat-hardening step can be shortened.

Coating plant

A coating plant for carrying out a coating method in accordance with an embodiment of the present invention will be described with reference to FIGS. 5 to 13, hereinbelow.

In the coating method carried out by the plant, rotational coating in accordance with an embodiment of the present invention is applied to the clear coating. In this embodiment, a clear thermosetting coating composition containing therein solvent and a setting step is effected between the coating step and the heat-hardening step. The heat-hardening step includes a pre-heat-hardening step of partly hardening the coating composition and a main heat-hardening step of full hardening the coating composition. A temperature holding step is effected early in the pre-heat-hardening step. The clear coating composition is applied to a thickness larger than a limit thickness over which the coating composition will normally run or sag during both the setting step and the pre-heat-hardening step (especially during the temperature holding step) and the work is rotated to prevent the coating composition from running or sagging in both the setting step and the pre-heat-hardening step. Further the coating composition is arranged so that the coating composition has a flowability and at the same time the solvent accounts for not more than 30% or 10% by weight of the coating composition at a time during the setting step and the pre-heat-hardening step (especially the temperature holding step).

Figure 5:
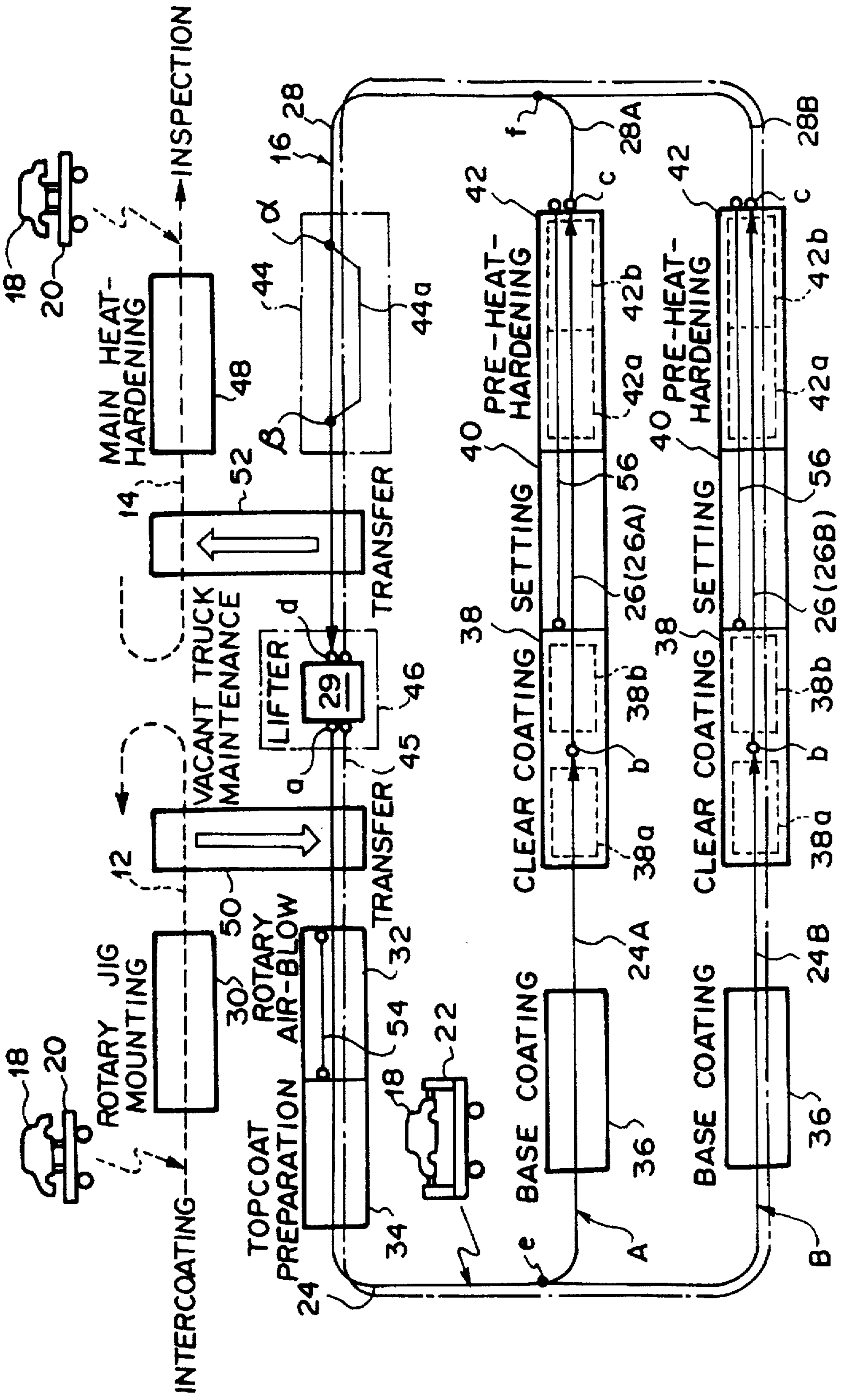
FIG. 5 is a schematic plan view of a plant for carrying out a coating method in accordance with an embodiment of the present invention.
Figure 6:
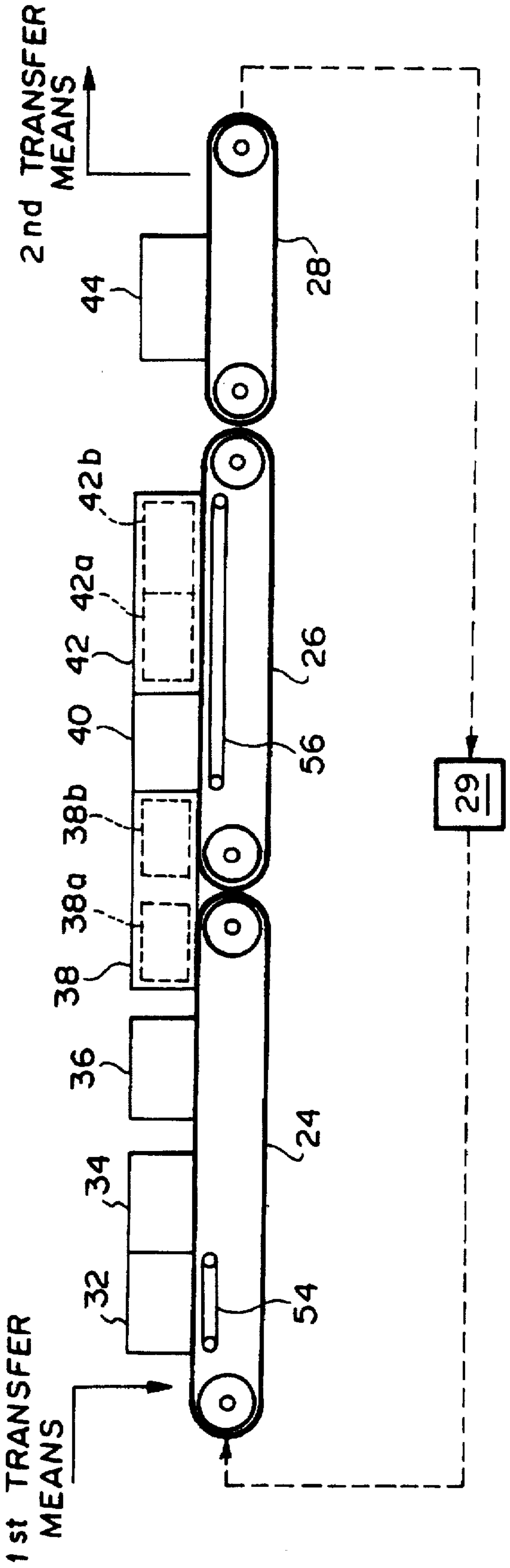
FIG. 6 is a schematic front view of an important part of the plant shown in FIG. 5.

As shown in FIGS. 5 and 6, the coating plant is provided with a first conveyor 12 for non-rotary trucks (will be referred to as "the first non-rotary conveyor 12", hereinbelow), a second conveyor 14 for non-rotary trucks (will be referred to as "the second non-rotary conveyor 14", hereinbelow) and a conveyor 16 for rotary trucks (will be referred to as "the rotary conveyor 16", hereinbelow). The first non-rotary conveyor 12 and the second non-rotary conveyor 14 convey non-rotary trucks 20 which hold stationary vehicle bodies (works) 18 respectively in the directions of arrows, and the rotary conveyor 16 conveys, in the direction an arrow, rotary trucks 22 which holds the vehicle body 18 to be rotatable about an axis extending substantially in a horizontal direction.

The rotary conveyor 16 is arranged in an endless fashion and includes first to third conveyors 24, 26 and 28 which can convey the rotary trucks 22 independently from each other. The second conveyor 26 comprises a pair of conveyors 26A and 26B extending in parallel to each other. The upstream end of the first conveyor 24 is connected to a lifter 29 (to be described later) in a position a, and the downstream end portion of the first conveyor 24 branches into a pair of branch conveyors 24A and 24B at a junction e. The downstream ends of the branch conveyors 24A and 24B are respectively connected to the upstream ends of the conveyors 26A and 26B in positions b. The downstream end of the third conveyor 28 is connected to the lifter 29 in a position d and to the upstream end of the first conveyor 24 through thew lifter 29, and the upstream end portion of the third conveyor 28 branches into a pair of branch conveyors 28A and 28B at a junction f. The upstream ends of the branch conveyors 28A and 28B are respectively connected to the downstream ends of the conveyors 26A and 26B in positions c.

Thus the rotary conveyors 16 has two lines, line A and line B, from the portion corresponding to a base coating zone (to be described later) to the portion corresponding to a pre-heat-hardening zone (to be described later). In the rotary conveyor 16, the conveying speed from the junction f to the junction e can can be made higher than the conveying speed from the junction e to the junction f through the lines A and B.

The first non-rotary conveyor 12 is provided with a rotary jig mounting zone 30. The rotary conveyor 16 is provided with a rotary air-blow zone 32, a topcoating preparation zone 34, a pair of base coating zones 36, a pair of clear coating zones 38 each comprising a first clear coating zone **38*a* and a second clear coating zone 38*b*, a pair of setting zones 40, a pair of pre-heat-hardening zones 42 each comprising a temperature raising zone 42*a* and a half-heat-hardening zone 42*b*, a pooling zone 44 having conveyor 44*a* for pooling and a vacant truck maintenance zone 46 comprising said lifter 29 and a conveyor 45 for maintenance of vacant trucks in this order from the upstream side. The base coating zones 36, clear coating zones 38, setting zones 40, and the pre-heat-hardening zones 42 are provided each in the lines A and B. The second non-rotary conveyor 14 is provided with a main heat-hardening zone 48**.

The rotary air-blow zone 32, the topcoating preparation zone 34 and the base coating zones 36 are provided on the first conveyor 24. The clear coating zones 38 are provided at the junctions of the branch conveyors 24A and 24B of the first conveyors 24 to the conveyors 26A and 26B. More particularly, the first clear coating zones **38*a* are on the first conveyor 24 (branch conveyors 24A and 24B) and the second clear coating zones 38*b* are on the second conveyor 26 (conveyors 26A and 26B). The setting zones 40 and the pre-heat-hardening zones 42 are provided on the second conveyor 26 (conveyors 26A and 26B) together with the second clear coating zones 38*b*. The pooling zone 44 is provided on the third conveyor 28. The vacant truck maintenance zone 46 is provided between the downstream end of the third conveyor 28 and the upstream end of the first conveyor 24**.

A first transfer means 50 for transferring the vehicle body 18 conveyed by the non-rotary truck 20 on the first non-rotary conveyor 12 to the rotary truck 22 on first conveyor 24 of the rotary conveyor 16 is provided between the first non-rotary conveyor 12 and the rotary conveyor 16. A second transfer means 52 for transferring the vehicle body 18 conveyed by the rotary truck 22 on the third conveyor 28 to the non-rotary truck 20 on the second non-rotary conveyor 14 is provided between the second non-rotary conveyor 14 and the rotary conveyor 16. The rotary air-blow zone 32 is provided with a sub conveyor 54 for rotating the vehicle body 18 on the rotary truck 22 while the rotary truck 22 passes through the rotary air-blow zone 32. The setting zone 40 and the pre-heat-hardening zone 42 on each of the lines A and B are provided with a sub conveyor 56 for rotating the vehicle body 18 on the rotary truck 22 while the rotary truck 22 passes through the setting zone 40 and the pre-heat-hardening zone 42.

Figure 7:
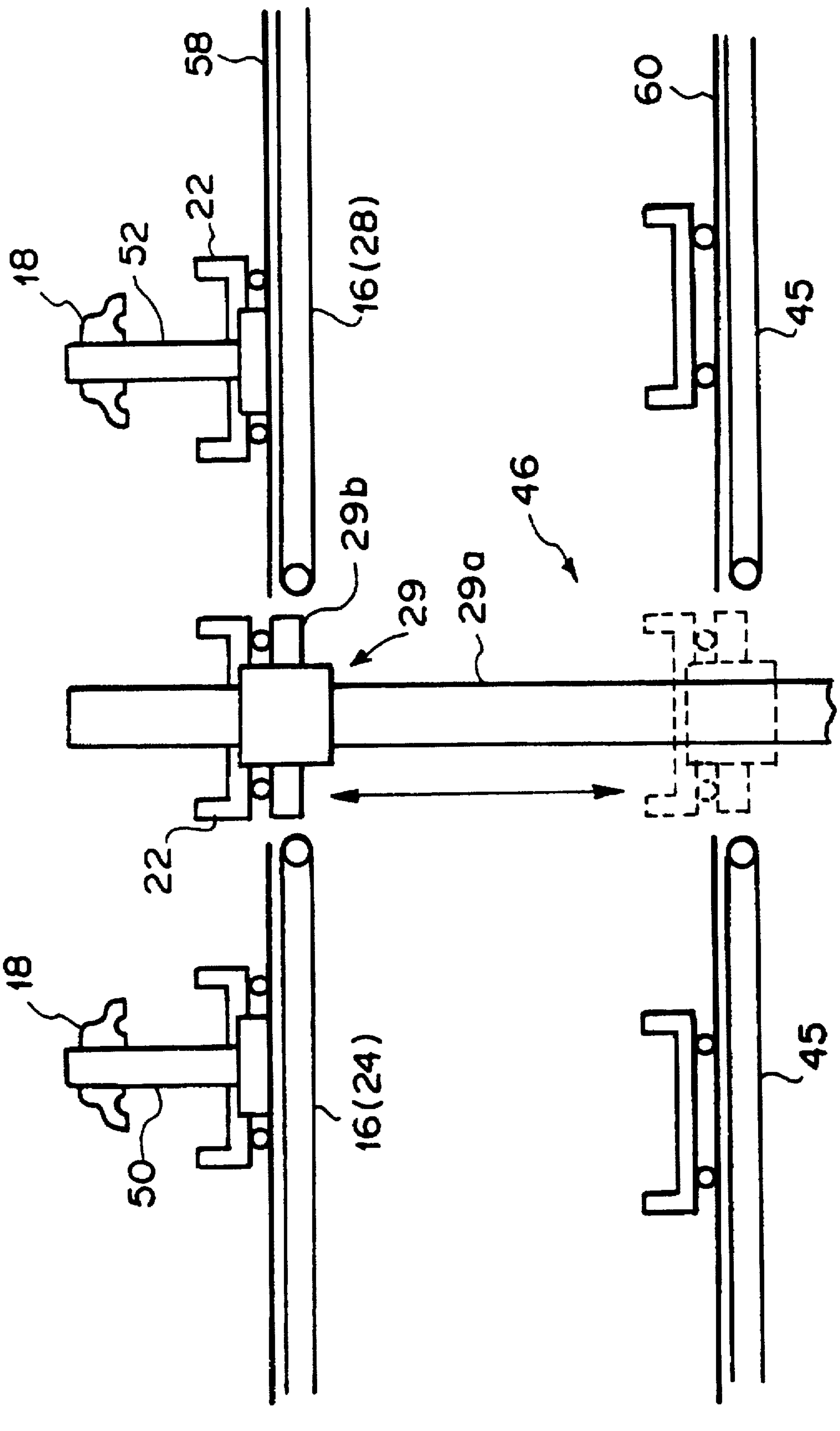
FIG. 7 is a schematic front view showing the vacant truck storage section of the plant shown in FIG. 5.

As shown in FIG. 7, the first non-rotary conveyor 12, second non-rotary conveyor 14 and the rotary conveyor 16 are disposed on an upper floor 58 and the conveyor 45 for maintenance of vacant trucks (will be referred to as "the maintenance conveyor 45" hereinbelow) is disposed on a lower floor 60. The lifter 29 comprises a vertical column **29*a* extending from the lower floor 60 to the upper floor 58 and a truck support 29*b* which is moved up and down along the column 29*a* by a driving means not shown. The lifter 29 transfers the vacant rotary truck 22, from which the vehicle body 18 has been removed by the second transfer means 52, to the maintenance conveyor 45 on the lower floor 60. The maintenance conveyor 45 is arranged in an endless fashion with the lifter 29 intervening between the upstream end and the downstream end thereof and extends on the lower floor 58 in the manner similar to the rotary conveyor 16 on the upper floor 60. The vacant rotary truck 22 conveyed by the maintenance conveyor 45 to the downstream end thereof is transferred to the first conveyor 24 on the upper floor 60 by the lifter 29**.

Figure 8:
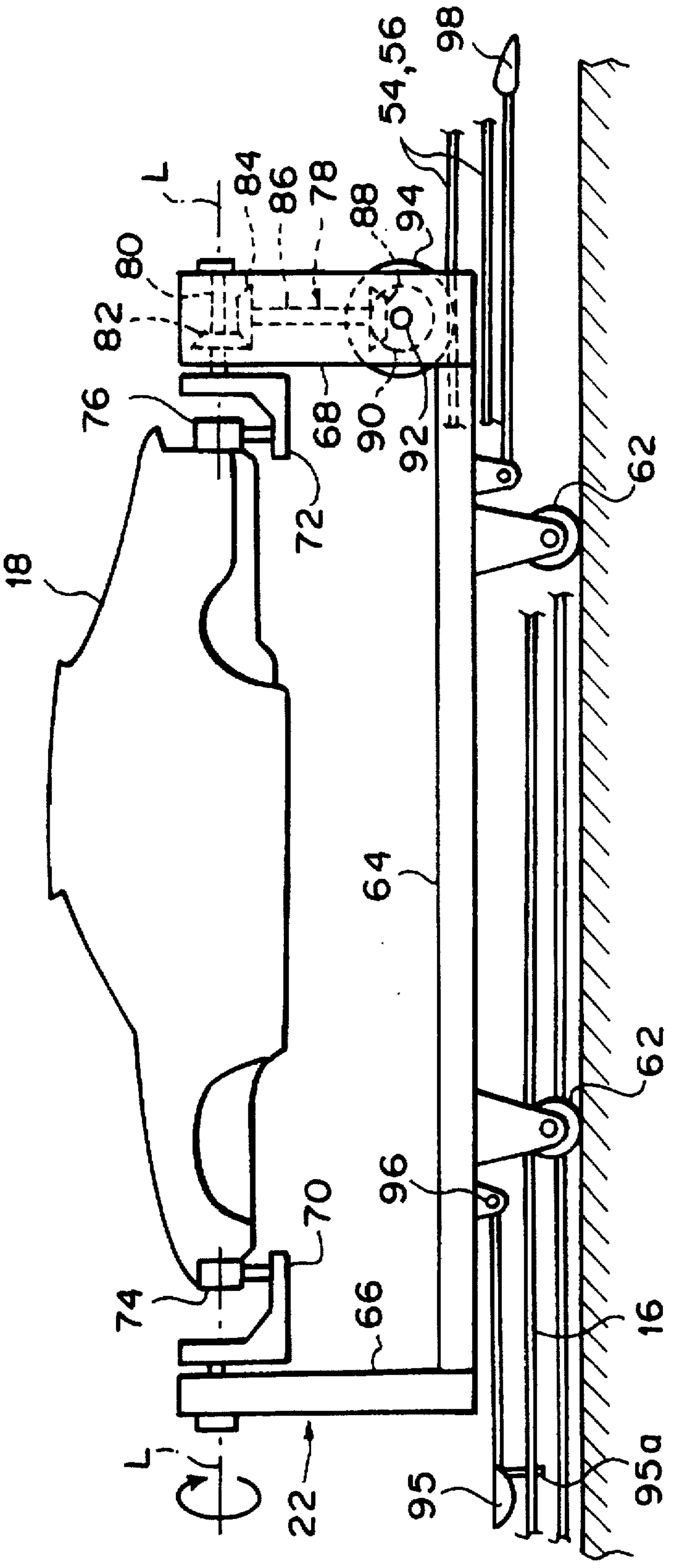
FIG. 8 is a front view of an example of a rotary truck.
Figure 9:
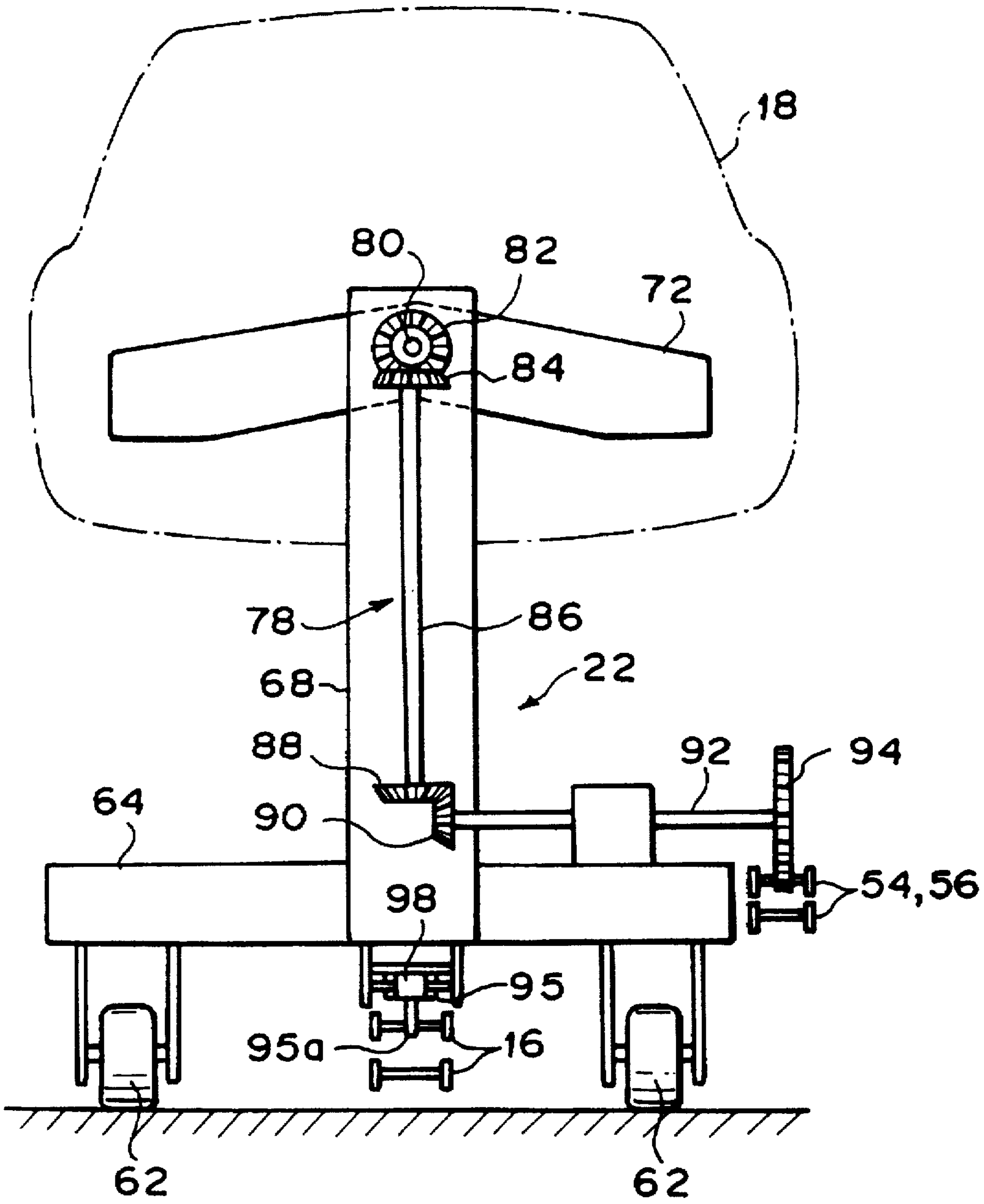
FIG. 9 is a right side view of the rotary truck shown in FIG. 8.

As shown in FIGS. 8 and 9, the rotary truck 22 comprises a base table 64 having wheels 62, a pair of support members 66 and 68 which are fixedly mounted on the base table 64 at a predetermined space in the direction of conveyance to extend vertically, and a pair of rotary supports 70 and 72 which are respectively mount on the support members 66 and 68 in alignment with each other for rotation about a rotational axis L substantially extending in a horizontal direction.

Rotary jigs 74 and 76 are mounted respectively on the front and rear ends of the vehicle body 18 and the jigs 74 and 76 are connected to the rotary supports 70 and 72, whereby the vehicle body 18 is held between the support members 66 and 68 to be rotatable about the rotational axis L.

A rotation transmitting mechanism 78 for rotating the rear rotary support 72 is provided in the rear support member 68. The rotation transmitting mechanism 78 comprises a bevel gear 82 fixed to a rotational shaft 80 of the rotary support 72, a bevel gear 84 which is fixed to one end of a shaft 86 and is in mesh with the bevel gear 82, a bevel gear 88 fixed to the other end of the shaft 86, a bevel gear 90 which is fixed to one end of a shaft 92 and is in mesh with the bevel gear 88 and a sprocket 94 fixed to the other end of the shaft 92. The sprocket 94 is adapted to be engaged with said sub conveyors 54 and 56 which comprises chains. In this rotation transmitting mechanism 78, when a difference is generated between the conveying speed of the rotary truck 22 and the driving speed of the sub conveyors 54 and 56, the sprocket 94 is rotated and the rotation of the sprocket 94 is transmitted to the rear rotary support 72 through the rotation transmitting mechanism 78, whereby the vehicle body 18 is rotated about the rotational axis L. By adjusting the driving speed of the sub conveyors 54 and 56, the rotational speed and/or rotational direction of the vehicle body 18 can be changed and at the same time the vehicle body 18 can be rotated even while the rotary truck 22 is stopping.

An engagement piece 95 which extends forward and is provided with a downward projection **95*a* is mounted on the front side of the base table 64 to be rotatable about about a pin 96**. By way of an engagement between the projection 95*a* and the rotary conveyor 16 which is of chains, the rotary truck 22 is conveyed at the driving speed of the rotary conveyor 16. An engagement release piece 98 is mounted on the rear side of the base table 64 to extend rearward at a predetermined level held by a holding member (not shown). When a succeeding rotary truck 22 approaches a rotary truck 22 and the engagement piece 95 of the succeeding rotary truck 22 rides on the engagement release piece 98 of the forward rotary truck 22, the engagement piece 95 of the succeeding rotary truck 22 is rotated upward and the engagement between the projection **95*a* and the rotary conveyor 16 is released, whereby the succeeding rotary truck 22 can be stopped short of the forward rotary truck 22 even if the rotary conveyor 16 is operating with the forward rotary truck 22** stopped.

In the pre-heat-hardening zone 42, a preheating oven 100 (FIGS. 10 and 11) extends over the entire length of the zone 42. Pre-heat-hardening of the base coating and the clear coating on the vehicle body 18 is effected by passing the vehicle body 18 through the preheating oven 100.

Figure 10:
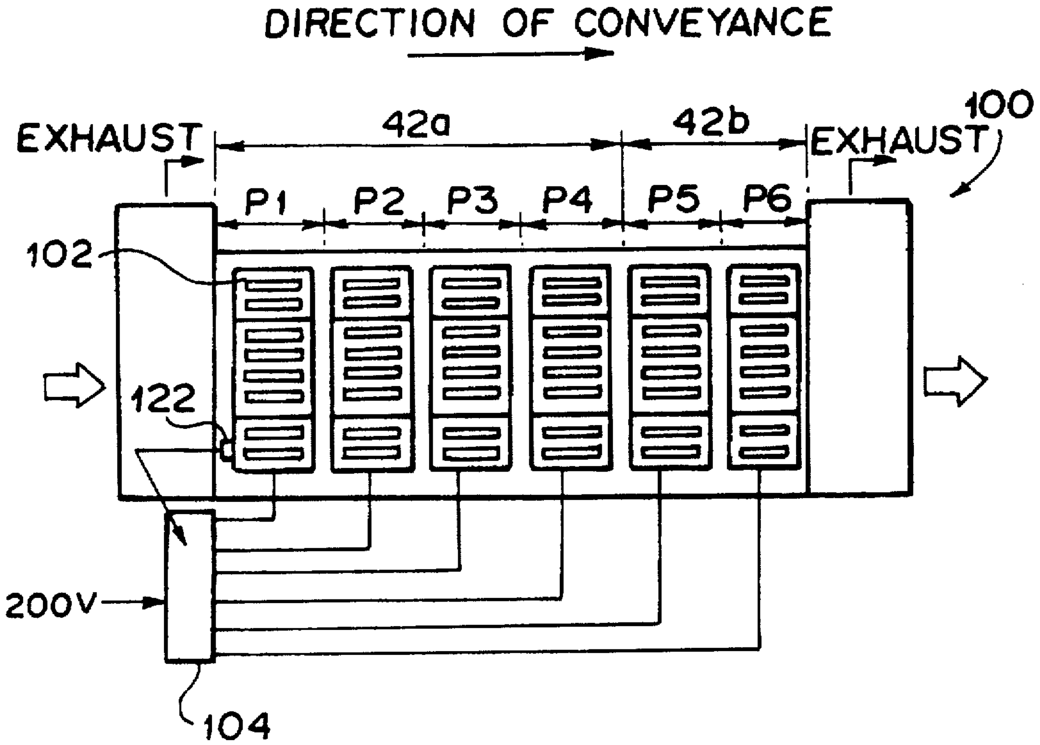
FIG. 10 is a front view of the preheating oven.
Figure 11:
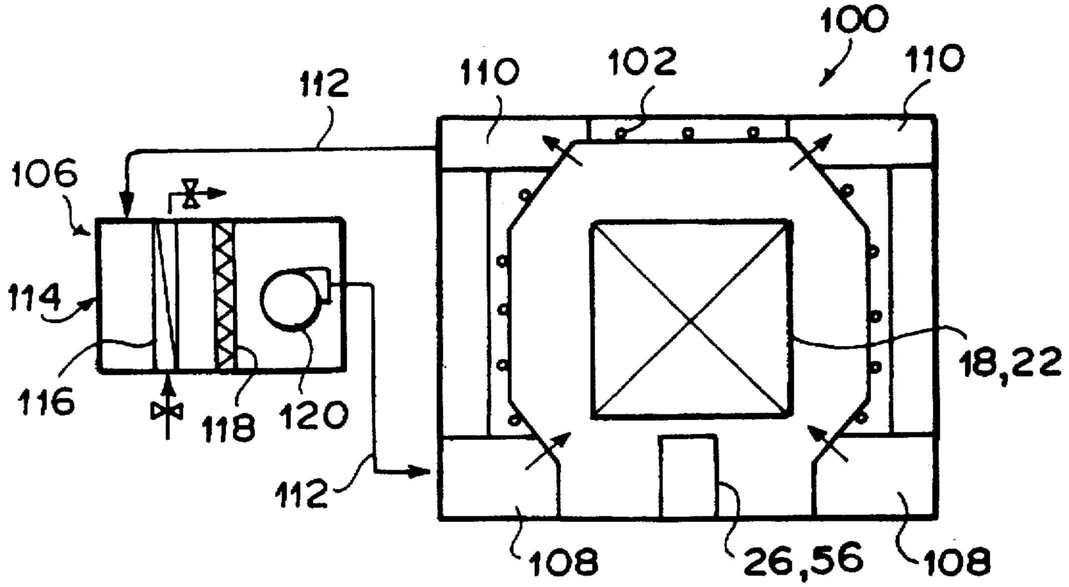
FIG. 11 is a right side view of the preheating oven shown in FIG. 10.

As shown in FIGS. 10 and 11, the preheating oven 100 comprises a tunnel-like far-infrared oven and each of the conveyors 26A and 26B and each of the sub conveyors 56 extends through the oven. The preheating oven 100 is in the form of a divided heating oven in which a plurality of (six in this particular embodiment) heating zones P1 to P6 are arranged in a row in the direction of conveyance of the vehicle body 18 and each of the heating zones P1 to P6 is provided with a plurality of far-infrared irradiating means 102 as a heat source. As shown in FIG. 11, the far-infrared irradiating means 102 in each heating zone are arranged in U-shape at predetermined intervals on the inner surface of the oven. The supply voltages for the heating zones can be controlled independently from each other by a controller 104. In order to prevent solvent evaporating from the coating composition from filling the preheating oven 100, a ventilator 106 is provided in the oven 100. The ventilator 106 comprises an air supply box 108 disposed on the lower side of the oven 100, an exhaust box 110 disposed on the upper side of the oven 100, and a pumping means 114 provided in an air passage 112 between the air supply box 108 and the exhaust box 110. The pumping means 114 comprises a heat exchanger 116 whose heat source is steam, a filter 118 and an air supply fan 120. Hot air heated to a predetermined temperature by the heat exchanger 116 is introduced into the oven 100 through the air supply box 108 and moves upward in the oven 100 to be exhausted through the exhaust box 110. The air exhausted through the exhaust box 110 is partly released to the atmosphere and is partly returned to the heat exchanger 106 by the pumping means 114. The exhausted through the exhaust box 110 and returned to the heat exchanger 106 is heated to the predetermined temperature together with fresh air and introduced into the oven 100 again through the air supply box 108. A temperature sensor 122 is provided for each of the heating zones P1 to P6 (only the sensor 122 for the heating zone P1 is shown in FIG. 10) and the controller 104 feedback-controls the far-infrared irradiating means 102 in each heating zone on the basis of the output of the temperature sensor 122.

The upstream side four heating zones P1 to P4 form the temperature raising zone **42*a* and the other two heating zones P5 and P6 form the half-heat-hardening zone 42*b***.

A main heating oven 124 extends over the entire length of the main heat-hardening zone 48, and the base coating film and the clear coating film on the vehicle body 18 are full hardened by passing through the main heating oven 124.

Figure 12:
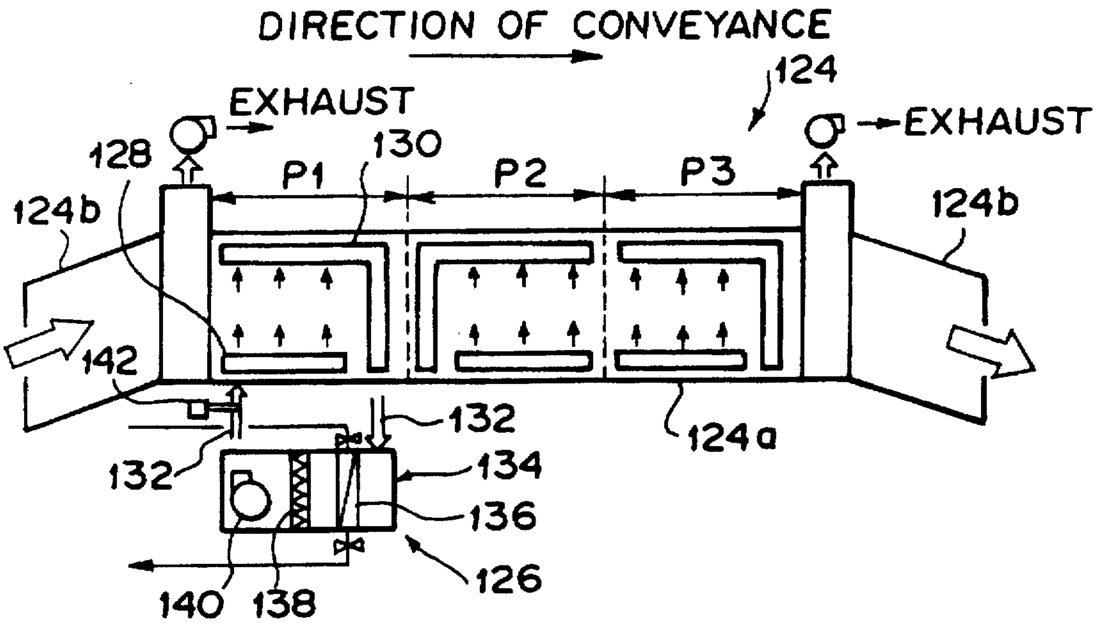
FIG. 12 is a front view of the main heating oven.
Figure 13:
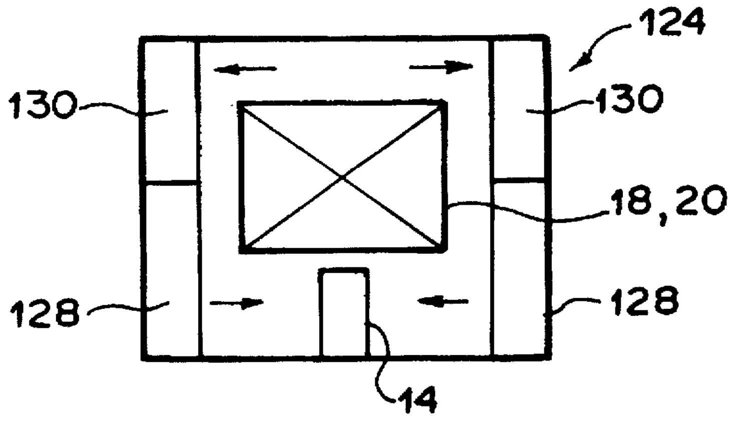
FIG. 13 is a right side view of the main heating oven shown in FIG. 12.

As shown in FIGS. 12 and 13, the main heating oven 124 is in the form of an angular oven which extends in the direction of conveyance in a tunnel-like fashion. The over 124 comprises a base portion **124*a* at which the coating films on the vehicle body 18 are actually heated and a pair of inclined portions 124*b* provided on opposite sides of the base portion 124*a* to raise the base portion 124*a* to an elevated position. In the oven 124, hot air is used as the heat source. The second non-rotary conveyor 14 extends through the main heating oven 124 and the vehicle body 18 on the non-rotary truck 20 is passed through the oven 124. In this oven 124, the base portion 124b comprises a plurality of (three in this particular embodiment) heating zones P1 to P3 arranged in a row in the direction of conveyance of the vehicle body 18. Each of the heating zones P1 to P3 is provided with a hot air supply means 126, and the temperature and the flow rate of the hot air discharged from the hot air supply means 126 in the heating zones P1 to P3 can be controlled independently. The hot air supply means 126 comprises an air supply box 128 disposed on the lower side of the oven 124, an exhaust box 130 disposed on the upper side of the oven 124, and a pumping means 134 provided in an air passage 132 between the air supply box 102 and the exhaust box 130. (The air passage 132 and the pumping means 134 are only shown for the heating zone P1) The pumping means 134 comprises a heat exchanger 136 whose heat source is steam, a filter 138 and an air supply fan 140. Hot air heated to a predetermined temperature by the heat exchanger 136 is introduced into the oven 124 through the air supply box 128 and moves upward in the oven 124 to be exhausted through the exhaust box 130. The air exhausted through the exhaust box 130 is returned to the heat exchanger 106 by the pumping means 134 and is recirculated. A temperature sensor 142 for detecting the temperature of the hot air introduced into each heating zone is provided for each of the heating zones P1 to P3, and the temperature of the hot air in each heating zone is feedback-controlled on the basis of the output of the temperature sensor 142**.

Method of coating

How to coat the vehicle body 18 by the plant described above will be described, hereinbelow. A vehicle body 18 finished with the intercoating is conveyed on the non-rotary truck 20 by the first non-rotary conveyor 12 in the direction of the arrow (FIG. 5) and the rotary jigs 74 and 76 are mounted on the front and rear sides of the vehicle body 18 in the rotary jig mounting zone 30. Thereafter the vehicle body 18 is transferred to the rotary truck 22 on the rotary conveyor 16 from the non-rotary truck 20 by the first transfer means 50.

The vehicle body 18 is then conveyed on the rotary truck 22 through the rotary air-blow zone 32, and while passing through the rotary air-blow zone 32, the vehicle body 18 is rotated by the sub conveyor 54 and air is blow on the vehicle body 18, whereby dirt, dust and the like on or in the vehicle body 18 are removed. Then the vehicle body 18 is conveyed to the topcoating preparation zone 34 and the vehicle body 18 is swept with ostrich feather to completely remove dirt, dust and the like on the vehicle body 18. Thereafter, the vehicle body 18 is alternately introduced into the line A or B and conveyed to the base coating zone 36 where the base coating composition (for the topcoating) is applied to the vehicle body 18. In this embodiment, the base coating composition comprise acryl-melamine resin containing therein lustering material such as aluminum or mica and pigments and the like and is applied on the intercoating film. The base coating composition is, for instance, once applied to the outer surface of the vehicle body 18, and then applied to the door openings, the inner side of the doors and the like, and then applied to the outer surface of the vehicle body 18 twice. Generally the base coating composition contains a solvent which is low in boiling point and is ready to evaporate and is applied in a relatively small thickness (e.g., 20μ). Accordingly the coating composition cannot run or sag.

Thereafter the vehicle body 18 is conveyed to the clear coating zone 38, and the clear coating composition is applied on the base coating film by a suitable coating means such as a coating robot. A predetermined idle zone is provided between the base coating zone 36 and the clear coating zone 38 and the solvent in the base coating composition is sufficiently evaporated while the vehicle body 18 is passed through the idle zone.

The clear coating composition to be applied on the base coating film comprises, in this particular embodiment, a clear resin coating composition of acrylmelamine resin containing a volatile solvent. The clear coating composition is applied twice in the clear coating zone 38. That is, in the first clear coating zone **38*a* provided on the downstream end portion of the first conveyor 24, the clear coating composition is first applied to a thickness smaller than the running limit thickness in the setting zone 40, and then the rotary truck 22 carrying the vehicle body 18 is transferred to the second conveyor 26 in the position b. Then the vehicle body 18 is conveyed to the second clear coating zone 38*b* provided on the upstream end portion of the second conveyor 26 and the clear coating composition is applied on the clear coating film applied in the first clear coating zone 38*a* so that the total thickness of the clear coating film becomes not smaller than the running limit thickness in the setting zone 40 and the temperature-raising zone 42*a***.

After the clear coating, the vehicle body 18 is conveyed to the setting zone 40 and the volatile solvent in the clear coating composition is caused to evaporate at an ordinary temperature while the vehicle body 18 is passed through the setting zone 40. While the vehicle body 18 is passed through the setting zone 40, the vehicle body 18 is rotated by the sub conveyor 56 to prevent running or sagging of the coating composition.

While the vehicle body 18 is passed through the setting zone 40, the volatile solvent in the coating composition gradually reduces and the flowability of the coating composition gradually lowers. The coating composition has sometimes lost its flowability by the end of the setting. The setting conditions, i.e., the setting temperature and the setting time may be suitably set according to the kind of the clear coating composition (e.g., kind of the resin and the solvent, and the amounts thereof), the thickness of the coating film, the pre-heat-hardening conditions and the like.

After the setting, the vehicle body 18 is conveyed to the pre-heat-hardening zone 42, and the clear coating film is pre-heat-hardened while the vehicle body 18 is passed through the preheating oven in the pre-heat-hardening zone 42. In the temperature raising zone **42*a* of the pre-heat-hardening zone 42, a temperature-raising step of raising the temperature of the clear coating composition to its reaction starting temperature, and in the course of heating the coating composition to the reaction starting temperature, a temperature holding step of holding the temperature of the coating composition at a predetermined temperature lower than the reaction starting temperature and higher than the ordinary temperatures for a predetermined time is effected, whereby a sufficient amount of the solvent is evaporated while keeping the flowability of the clear coating composition. Then in the half-heat-hardening zone 42*b*, the temperature of the coating composition is held not lower than the reaction starting temperature, whereby the coating composition is partly hardened (pre-heat-hardening). The pre-heat-hardening is for hardening the coating composition to such an extent that even if dust or the like is subsequently deposited on the surface of the clear coating film, the dust can be readily burnt off by subsequent heating. For example, the coating composition is caused to make crosslinking reaction up to about 40%. Also the base coating film is subjected to the temperature holding in the temperature raising zone 42*a* and is partly hardened in the half-heat-hardening zone 42*b***.

Though the flowability of the clear coating composition is very low or null at the end of the setting, the solid component or the resin component is softened (reduced in viscosity) in the course of the temperature of the coating composition being raised to the reaction starting temperature in the temperature raising zone **42*a* and the flowability of the coating composition rapidly increases to a state where running or sagging can take place. The flowability lowers as the solvent subsequently evaporates and the flowability is rapidly lost at the time the temperature of the coating composition reaches the reaction starting temperature and the coating composition begins reaction in the half-heat-hardening zone 42*b***.

The predetermined temperature and the predetermined time in the temperature holding step may be suitably set according to the kind of the clear coating composition (e.g., kind of the resin and the solvent, and the amounts thereof), the thickness of the coating film, the setting conditions and the like so that the amount of the solvent can be reduced to a target value while keeping a flowability of the coating composition. The predetermined temperature may be changed according to the predetermined time and the predetermined time may be changed according to the predetermined temperature. Preferably the predetermined temperature is in the range from a temperature higher than the ordinary temperatures by at least 20° C. (generally 40° C.) to a temperature lower than the reaction starting temperature by at least 10° C. Preferably the predetermined time is set so that the coating composition can be held in such a state for at least one minute that the solvent accounts for a target proportion of the coating composition (i.e., not more than 30% or 10% by weight) and the coating composition has a flowability. Also the half-heat-hardening conditions, i.e., the temperature and the time, may be suitably set according to the kind of the clear coating composition (e.g., kind of the resin and the solvent, and the amounts thereof), the thickness of the coating film, the setting conditions, the temperature holding conditions and the like.

Figure 14:
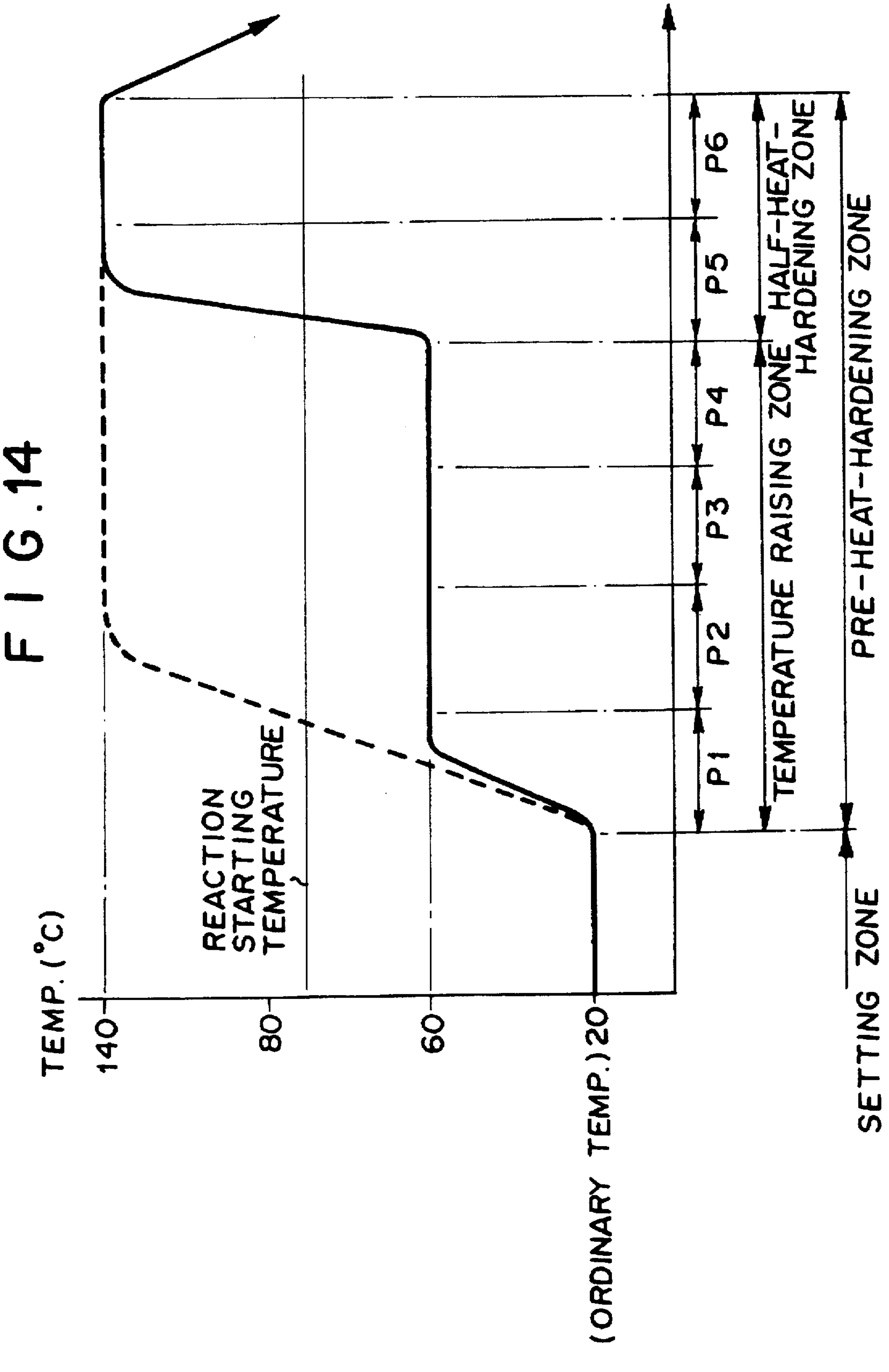
FIG. 14 is a view showing the change in the temperature of the coating composition in the pre-heat-hardening step which includes the temperature holding step.

FIG. 14 shows an example of change in temperature of the clear coating composition in the pre-heat-hardening zone 42. As shown in FIG. 14, in the setting zone 40, the coating composition is held at an ordinary temperature (20° C. in this embodiment), and when the vehicle body 18 is conveyed into the pre-heat-hardening zone 42, the temperature of the coating composition is raised to its reaction starting temperature (70° C. to 80° C. in this embodiment) and is held at a predetermined temperature (60° C. in this embodiment) lower than the reaction starting temperature and higher than the ordinary temperatures for a predetermined time in the course of raising the temperature to the reaction starting temperature in the temperature raising zone **42*a* (heating zones P1 to P4). The predetermined temperature need not be constant but may change in a predetermined temperature range. For example, the predetermined temperature may be gradually increased. Then in the half-heat-hardening zone 42*b* (heating zones P5 and P6**), the temperature of the coating composition is raised to a predetermined temperature (140° C. in this embodiment) not lower than the reaction starting temperature, and the coating composition is caused to half harden at the predetermined temperature.

The predetermined time in the temperature holding step can be changed by changing the temperature (atmospheric temperature) in the heating zones P1 to P4 and the predetermined time can be changed changing the number of the heating zones actually used. For example, the number of the vehicle bodies 18 to be coated a day is changed, the conveying speed of the rotary conveyor 16 is changed whereby the the conveying speed of the vehicle body 18 through the preheating oven is changed. In such a case, when the same number of heating zones are used, the predetermined time in the temperature holding step changes, and accordingly the number of the heating zones actually used for the temperature holding step is changed. For example, when the conveying speed is lowered, only the heating zones P1 to P3 are used for the purpose of temperature holding with the heating zones P4 and P5 used as the half-heat-hardening zone and with the heating zone P6 nut used, whereby said predetermined time can be readily held unchanged.

Also the temperature of the coating composition and the heating time in the half-heat-hardening zone 42*b* can be readily changed by the number of the heating zones actually used and the atmospheric temperature therein.

In the embodiment described above, the atmospheric temperatures in the respective heating zones P1 to P4 are the same, and accordingly when the heat capacity of the work is large and it takes along to raise the temperature of the coating composition to the predetermined temperature, the temperature raising zone 42*a* must be longer. In such a case, by increasing the temperature in the heating zone P1 higher than the those in the other heating zones so that the temperature of the coating composition rises to the predetermined temperature in a shorter time, the preheating oven may be small in length. That is, by separately controlling the temperature in the respective heating zones, the temperature raising pattern can be variously changed for various purposes.

In the pre-heat-hardening zone 42, especially in the temperature raising zone 42*a*, the solid component of the coating composition is softened and the flowability of the coating composition becomes very high, whereby the coating composition comes into "the running state". Accordingly, in the pre-heat-hardening zone 42, the vehicle body 18 is kept rotated following in the setting zone 40 by the sub conveyor 56 to prevent running or sagging of the coating composition. Since the rotation of the vehicle body 18 is for preventing running and sagging of the coating composition, the vehicle body 18 need not be rotated in the heating zone P6 if the coating composition comes into "the non-running state" in the heating zone P5 as shown in FIG. 14.

Further, though, in the embodiment described above, the temperature holding step is effected in the temperature raising zone 42*a*, the temperature of the coating composition may be directly raised above the reaction starting temperature without effecting the temperature holding step. In this case, the temperature of the coating composition is linearly raised above the reaction starting temperature as shown by the broken line in FIG. 14.

After the pre-heat-hardening in the pre-heat-hardening zone 42, the rotary truck 22 carrying the vehicle body 18 is transferred to the third conveyor 18 in the position c, and conveyed to the pooling zone 44 with the vehicle bodies 18 on the lines A and B merging together at the junction f. The vehicle body 18 is pooled in the pooling zone 44 as required, and then is transferred to the non-rotary truck 20 on the second non-rotary conveyor 14 by the second transfer means 52. Thereafter the vehicle body 18 on the non-rotary truck 20 is conveyed into the main heat-hardening zone 48 by the second non-rotary conveyor 14. While the vehicle body 18 is passed through the main heat-hardening zone 48, the base coating film and the clear coating film are held at a predetermined temperature not lower than the reaction starting temperature for a predetermined time, whereby the coating films are hardened to a final degree, which may be such as obtained by about 80% crosslinking reaction of the coating composition.

Since in both the main heat-hardening step effected in the main heat-hardening zone 48 and the half-heat-hardening step effected in the half-heat-hardening zone 42*b* of the pre-heat-hardening zone 42, the temperature of the coating composition is held not lower than the reaction starting temperature and the coating composition is caused to make reaction, the main heat-hardening step and the half-heat-hardening step form the reaction-hardening step described previously.

After the main heat-hardening step, the vehicle body 18 is conveyed to an inspection zone (not shown) to be checked with the coating.

The vacant rotary truck 22 from which the vehicle body 18 has been transferred to the non-rotary truck 20 on the second non-rotary conveyor 14 is conveyed to the lifter 29 and is transferred to the maintenance conveyor 45 on the lower floor by the lifter 29. Then the rotary truck 22 is subjected to maintenance such as cleaning, upkeep, check and the like while it is conveyed to the downstream end of the maintenance conveyor 45 and then transferred again to the rotary conveyor 16 by the lifter 29. That is, the rotary truck 22 is subjected to the maintenance every time it runs over the rotary conveyor 16, and then reused. The rotary conveyor 16 is subjected to maintenance at regular intervals. During maintenance, all the rotary trucks 22 on the rotary conveyor 16 are transferred to the maintenance conveyor 45 on the lower floor. Accordingly, the maintenance conveyor 45 should have a length sufficient to accommodate all the rotary trucks 22 on the rotary conveyor 16. Simultaneously with maintenance of the rotary conveyor 16, maintenance of the rotary truck 22 can be effected.

Modifications of the coating plant

Though, in this embodiment, the heating oven for the heat-hardening step is divided into the preheating oven and main heating oven which are disposed in different positions, the pre-heat-hardening and the main-heat-hardening may be effected in a heating oven. Though the preheating oven is of a far-infrared type and the main heating oven is of a hot air type, other various types of ovens can be used.

When the preheating and the main heating are effected in separate ovens as in this embodiment, the following advantages are obtained. That is, as the heating oven, a hot-air type oven is simple in structure and low in the heat source cost, but when both the pre-heat-hardening and the main heat-hardening are effected in one hot-air type oven, there is involved the following problem. That is, since the coating composition is in the running state in the front portion of the oven, that is, the portion of the oven for pre-heat-hardening, the vehicle body 18 must be rotated and when the vehicle body 18 is rotated, dirt and dust in the vehicle body 18 get out of the vehicle body 18 and adheres to the coating film surface which is not hardened yet. Though such a problem can be avoided by use of, for instance, a far-infrared oven, the far-infrared oven is very expensive. Thus when a far-infrared oven is used for the pre-heat-hardening and a hot-air type oven is used from the main heat-hardening, the oven for the heat-hardening can be manufactured at relatively low cost.

Further when both the pre-heat-hardening and the main heat-hardening are effected in one hot-air type oven, the oven must be provided on the rotary conveyor 16 since the vehicle body 18 must be rotated in the portion of the oven for pre-heat-hardening, which results in a longer rotary coating line. Accordingly by separating the oven for the pre-heat-hardening from the oven for the main heat-hardening and providing only the oven for the pre-heat-hardening on the rotary conveyor 16 while providing the oven for main heat-hardening on the second non-rotary conveyor 14, the rotary coating line can be short.

Further when both the pre-heat-hardening and the main heat-hardening are effected in one hot-air type oven, it is preferred that the oven is an angular oven from the view point of the thermal efficiency. That is, in the angular oven, heat is accumulated in the base portion which is in an elevated position and heat is less apt to be dissipated from the ends of the oven than in a flat oven. However, in the oven, the vehicle body 18 must be rotated and the vehicle body 18 must be conveyed through the oven on the rotary truck 22 which is longer than the non-rotary truck 20. Accordingly, when the oven is of an angular type, the inclined portions on opposite ends of the base portion for raising the base portion to an elevated position must be long so that they merge to the flat portion at a small angle (otherwise the rotary truck which is longer than the non-rotary truck can be disengaged from the conveyor), which results in a larger length of the oven and a larger length of the rotary coating line. Accordingly by separating the oven for the pre-heat-hardening from the oven for the main heat-hardening and providing only the oven for the pre-heat-hardening (which may be a flat far-infrared oven and in which the vehicle body 18 must be rotated) on the rotary conveyor 16 while providing the oven for main heat-hardening (which is preferably a hot-air type angular oven and in which the vehicle body 18 need not be rotated) on the second non-rotary conveyor 14, the rotary coating line can be short and the cost for the ovens can be lowered.

Though, in the embodiment described above, the temperature raising step and the half-heat-hardening step are effected in a preheating oven, those steps may be effected in separate ovens. In this case, the vehicle body 18 may be rotated only in the oven for the temperature raising step since running or sagging of the coating composition basically occurs in the temperature raising step and does not occur in the half-heat-hardening step.

Pooling zone

Said pooling zone 44 will be described, hereinbelow. As described above, the pooling zone 44 is provided on the third conveyor 28 between the pre-heat-hardening zone 42 and the second transfer means 52. The pooling zone 44 is for temporarily staying a predetermined number of rotary trucks 22 carrying the vehicle bodies 18 which has finished with the pre-heat-hardening.

Generally the coating composition is applied to the vehicle body 18 a plurality of times and the thickness of the coating film normally becomes not smaller than the running limit thickness in the final coating zone. In the embodiment described above, the clear coating composition is applied to the first clear coating zone **38*a* and the second clear coating zone 38*b*, and the thickness of the clear coating film becomes not smaller than the running limit thickness in the second clear coating zone 38*b***.

In such a case, when some trouble occurs in a step before the thickness of the clear coating film becomes not smaller than the running limit thickness, e.g., failure in the coating robot or the conveyor, and the coating line is stopped, also the vehicle body 18 which has been applied with the coating composition in a thickness not smaller than the running limit thickness is stopped there, which permits the coating composition to run or sag and results in defect in coating.

In order to avoid the problem, in the coating line of this embodiment, the conveyor line is separated between the first clear coating zone **38*a* and the second clear coating zone 38*b*, and the first conveyor 24 on the side of the first clear coating zone 38*a* and the second conveyor 26 on the side of the second clear coating zone 38*b* are arranged to be driven separately from each other. This arrangements permits the second conveyor 26 to continuously convey the vehicle body 18 which has been applied with the coating composition in a thickness not smaller than the running limit thickness into the setting zone 40 and to rotate the vehicle body 18 to prevent running or sagging of the coating composition even if some trouble occurs in the first clear coating zone 38*a*** or the coating line upstream thereof.

However even with the arrangement described above, when some trouble occurs in the downstream side of the second clear coating zone **38*b*, e.g., in the second transfer means 52, the main heat-hardening zone 48, the inspecting zone and the subsequent assembly line, and it becomes impossible to convey the rotary truck 22 with the rotary conveyor 16 jammed with the trucks downstream of the second clear coating zone 38*b*, it becomes impossible to convey the vehicle body 18 out of the second clear coating zone 38*b* to the rotating zone, i.e., the setting zone 40 and the pre-heat-hardening zone 42**, which results in defect in coating.

The pooling zone 44 is for the purpose of avoiding the problem. That is, even if some trouble occurs in the second transfer means 52, the main heat-hardening zone 48, the inspecting zone and the subsequent assembly line, the vehicle body 18 can be conveyed out of the second clear coating zone **38*b* into the rotating zone and rotated to prevent running or sagging of the coating composition as well as to pre-heat-harden the coating film thereon to avoid a problem of adhesion of dust or the like to the coating film by moving the rotary trucks 22 on the rotary conveyor 16 downstream of the second clear coating zone 38*b* to the pooling zone 44**.

In this embodiment, the pooling zone 44 is formed by connecting a sideline conveyor **44*a* to the third conveyor 28 at junctions α and β so that the rotary trucks 22 can be temporarily stayed on the sideline conveyor 44*a*. The pooling zone 44** may be formed in other various manners.

For example, the pooling zone may be formed by the second and third conveyors 26 and 28 themselves by separating the conveyor line between the first clear coating zone **38*a* and the second clear coating zone 38*b* as in the embodiment described above and making the conveying rate (the number of trucks which can be conveyed in a unit time) higher in the second and third conveyors 26 and 28 on the side of the second clear coating zone 38*b* than in the first conveyor 24 on the side of the first clear coating zone 38*a*. That is, when the conveying rate of the second and third conveyors 26 and 28 are higher than the first conveyor 24, a space between successive two rotary trucks 22 becomes larger on the second and third conveyors 26 and 28 than on the first conveyor 24, and accordingly, when the rotary trucks 22 are put closer on the second and third conveyors 26 and 28, a certain space is formed on the conveyors 26 and 28. The space thus formed on the conveyors 26 and 28** can be used as a pooling zone.

Similarly, the pooling zone may be formed by the third conveyor 28 itself by separating the conveyor line on the side of the second clear coating zone **38*b* into a pair of conveyors (the second and third conveyors 26 and 28) in a predetermined position c downstream of the end of the pre-heat-hardening zone 42 (at the end of the pre-heat-hardening zone 42 in the embodiment described above) and making the conveying rate higher in the third conveyor 28 than in the second conveyor 26**.

The pooling zone 44 should be able to accommodate at least the same number of rotary trucks 22 as that of the rotary trucks 22 in the second clear coating zone **38*b* so that the vehicle bodies 18 which have been applied with the coating composition to a thickness not smaller than the running limit thickness in the second clear coating zone 38*b* can be all conveyed out of the zone 38*b***.

Preferably the pooling zone 44 can accommodate at least the same number of rotary trucks 22 as the sum of the numbers of the rotary trucks 22 in the second clear coating zone **38*b* and the setting zone 40 so that the vehicle bodies 18 in the second clear coating zone 38*b* and the setting zone 40 all can be conveyed into or passed through the pre-heat-hardening zone 42, whereby a problem of dust or the like adhering to the coating film while the vehicle body 18 is rotated for a long time in the setting zone 40** can be avoided.

More preferably the pooling zone 44 can accommodate at least the same number of rotary trucks 22 as the sum of the numbers of the rotary trucks 22 in the second clear coating zone **38*b*, the setting zone 40 and the pre-heat-hardening zone 42 so that the vehicle bodies 18 in the second clear coating zone 38*b*, the setting zone 40 and the pre-heat-hardening zone 42 all can be passed through the pre-heat-hardening zone 42 and the pre-heat-hardening of the coating films on all the vehicle body 18** can be finished, whereby a problem of dust or the like adhering to the coating film can be more surely avoided.

Control of the state of the coating composition up to hardening

Control of the state of the clear coating composition from the time it is applied to the vehicle body to the time it hardens will be described, hereinbelow.

As described above, a thermosetting clear coating composition containing therein solvent is used in the clear coating, and the coating composition is applied to the vehicle body 18 in the second clear coating zone **38*b* to a thickness larger than a limit thickness over which the coating composition on a surface of the vehicle body 18 extending in a vertical direction will normally run or sag under gravity during the setting step in the setting zone 40 and the pre-heat-hardening step in the pre-heat-hardening zone 42 and the vehicle body 18** is rotated in the setting step and the pre-heat-hardening step to prevent running or sagging of the coating composition.

In this case, as described above, the clear coating composition is controlled so that the coating composition has a flowability and at the same time the solvent accounts for not more than 30% (preferably 10%) by weight of the coating composition at a predetermined time in order to avoid the influence of the irregularities on the surface of the vehicle body 18.

The predetermined time may be any time up to the time the coating composition applied to a thickness larger than the limit thickness begins to harden. Accordingly, the coating composition may be controlled so that the coating composition has a flowability and at the same time the solvent accounts for not more than 30% (preferably 10%) by weight of the coating composition at a time during the setting step or the end of the same or so that the coating composition has a flowability and at the same time the solvent accounts for not more than 30% (preferably 10%) by weight of the coating composition at a time during the pre-heat-hardening step.

The control of the coating composition is effected by adjusting the kind of the coating composition, the kind and/or the amount of the solvent, the coating thickness, the setting condition, the pre-heat-hardening condition and/or the like.

For example, the state of the coating composition may be controlled in the following manners.

(1) Control of the state of the coating composition during the setting step or the end of the same (a) In the case where the amount of the solvent is too large though the coating composition has a sufficient flowability.

In this case, the coating composition should be controlled so that the amount of the solvent is reduced without lowering the flowability. Particular examples are as follows.

(a-1) To change part of the solvent to that which evaporates quickly (which is low in boiling point).

(a-2) To increase the proportion of the solid component.

(a-3) To increase the setting time.

(a-4) To raise the setting temperature within a range not higher than 40° C.

(b) In the case where the flowability of the coating composition is not sufficient though the amount of the solvent is small.

In this case, the coating composition should be controlled so that the amount of the solvent is increased to increase the flowability. Particular examples are as follows.

(b-1) To change part of the solvent to that which evaporates slowly (which is high in boiling point).

(b-2) To reduce the proportion of the solid component.

(b-3) To reduce the setting time.

Otherwise, the coating composition may be controlled so that the flowability is increased without changing the amount of the solvent. A particular example is as follows.

(b-4) To increase the thickness of the coating film.

(2) Control of the state of the coating composition during the heat-hardening step (In the case where the temperature holding step is not effected and the temperature of the coating composition is increased substantially linearly)

(a) In the case where the amount of the solvent is too large though the coating composition has a sufficient flowability.

In this case, the coating composition should be controlled so that the amount of the solvent is reduced without lowering the flowability. Particular examples are as follows.

(a-1) To increase the proportion of the solid component before the heat-hardening step (when the setting step is effected, at the end of the setting step). The methods described above at (a-1) to (a-4) in conjunction with the case (1) can be applied.

(a-2) To lower the temperature raising rate.

(b) In the case where the flowability of the coating composition is not sufficient though the amount of the solvent is small.

In this case, the coating composition should be controlled so that the amount of the solvent is increased to increase the flowability. Particular examples are as follows.

(b-1) To reduce the proportion of the solid component before the heat-hardening step (when the setting step is effected, at the end of the setting step). The methods described above at (b-1) to (b-3) in conjunction with the case (1) can be applied.

(b-2) To increase the temperature raising rate.

Otherwise, the coating composition may be controlled so that the flowability is increased without changing the amount of the solvent. Particular examples are as follows.

(b-3) To increase the thickness of the coating film.

(b-4) To change the coating composition to that having a higher reaction starting temperature.

(3) Control of the state of the coating composition during the heat-hardening step (In the case where the setting step and the temperature holding step are effected)

(a) In the case where the amount of the solvent is too large though the coating composition has a sufficient flowability.

In this case, the coating composition should be controlled so that the amount of the solvent is reduced without lowering the flowability. Particular examples are as follows.

(a-1) To increase the proportion of the solid component at the end of the setting step. The methods described above at (a-1) to (a-4) in conjunction with the case (1) can be applied.

(a-2) To raise said predetermined temperature at which the temperature of the coating composition is held.

(a-3) To elongate said predetermined time for which the temperature of the coating composition is held at said predetermined temperature.

(b) In the case where the flowability of the coating composition is not sufficient though the amount of the solvent is small.

In this case, the coating composition should be controlled so that the amount of the solvent is increased to increase the flowability. Particular examples are as follows.

(b-1) To reduce the proportion of the solid component at the end of the setting step. The methods described above at (b-1) to (b-3) in conjunction with the case (1) can be applied.

(b-2) To lower said predetermined temperature at which the temperature of the coating composition is held.

(b-3) To shorten said predetermined time for which the temperature of the coating composition is held at said predetermined temperature.

Otherwise, the coating composition may be controlled so that the flowability is increased without changing the amount of the solvent. A Particular example is as follows.

(b-4) To increase the thickness of the coating film.

(4) Control of the state of the coating composition during the heat-hardening step (In the case where the temperature holding step is effected without setting step)

(a) In the case where the amount of the solvent is too large though the coating composition has a sufficient flowability.

In this case, the coating composition should be controlled so that the amount of the solvent is reduced without lowering the flowability. Particular examples are as follows.

(a-1) To change part of the solvent to that which evaporates quickly (which is low in boiling point).

(a-2) To increase the proportion of the solid component.

(a-3) To raise said predetermined temperature at which the temperature of the coating composition is held.

(a-4) To elongate said predetermined time for which the temperature of the coating composition is held at said predetermined temperature.

(b) In the case where the flowability of the coating composition is not sufficient though the amount of the solvent is small.

In this case, the coating composition should be controlled so that the amount of the solvent is increased to increase the flowability. Particular examples are as follows.

(b-1) To change part of the solvent to that which evaporates slowly (which is high in boiling point).

(b-2) To reduce the proportion of the solid component.

(b-3) To lower said predetermined temperature at which the temperature of the coating composition is held.

(b-4) To shorten said predetermined time for which the temperature of the coating composition is held at said predetermined temperature.

Otherwise, the coating composition may be controlled so that the flowability is increased without changing the amount of the solvent. A Particular example is as follows.

(b-5) To increase the thickness of the coating film.

Control of the state of the coating composition during the setting step

Control of the state of the coating composition during the setting step will be described in more detail, hereinbelow. The inventors made various tests in which the state of the coating composition during the setting step was variously changed and the relation between the state of the coating composition and the smoothness of the coating film surface was investigated. The tests will be described hereinbelow.

(I) Test conditions (1) test piece (a) test plate

Steel plates 300 mm long, 100 mm wide and 0.7 mm thick were used. The steel plates had been subjected to laser treatment in order to uniform the irregularities on the their surfaces.

(b) surface treatment (1) electro-deposition coating: film thickness 20μ, heat-hardened at 175° C. for 30 min.

(2) intercoating: film thickness 35μ, thermosetting oil-free polyester resin coating composition, heat-hardened at 140° C. for 25 min.

After intercoating, polyester tape was applied to the coated surfaces of the test plates and the PGD values were measured. Among the test plates, those whose PGD values of the coated surface were 0.6 were selected in order to use only the test plates on the same finish level. PGD value is one of those which represent imaging sharpness and is determined in the following manner. That is, an image of a chart on which a plurality of digit figures of difference sizes are recorded is projected onto the coating film surface and an image of the chart projected on the coating film surface is taken by an image pickup device. PGD value is determined by the size of the smallest digit figures which can be recognized through the pickup device. Though PGD value is generally measured through the reflected light, the PGD values of the test plates were determined through the reflected light from polyester tape applied to the intercoating film surface in the test since the intercoating film surface was dull. PGD value of 0.6 is substantially equivalent to NSIC value of 50 to 60, and PGD value of not less than 1.0 is substantially equivalent to NSIC value of about 85 or more. NSIC value is another of those which represent imaging sharpness.

(2) topcoating (a) base coating (1) film thickness: 20μ

(2) coating composition: thermosetting acrylmelamine coating composition, N.V. (solid component in the coating composition)=20 wt %, viscosity=13 sec./#4FC·20° C.

(3) coating conditions

| | |
|---|---|
| coater | electrostatic spray coater |
| air pressure | 3.0 kg/cm$^2$ |
| spraying rate | 350 cc/min |
| voltage | −90 kV |
| distance | 300 mm |

(4) way of coating double coating (with interval of 5 minutes between the first coating and the second coating)

while conveying the work at a speed of 4.0 m/min with the work fixed in the vertical direction, the coating composition was sprayed onto the work at right angles thereto in reciprocating motion (stroke of reciprocation=1000 mm, reciprocating speed=70 m/min)

ratio of the thickness of the coating film applied first to that of the coating film applied second: 1:1

(b) clear coating (1) film thickness standard thickness 60μ comparison thickness 40μ

(2) coating composition standard composition: thermosetting acrylmelamine coating composition, N.V.=40 wt %, viscosity=22 sec./#4FC·20° C.

comparison composition 1: obtained by changing the solvent in the standard composition to a solvent which evaporates at a higher rate, N.V.=41.8 wt %, viscosity=25 sec./#4FC·20° C.

comparison composition 2: obtained by changing the solvent in the standard composition to a solvent which evaporates at a lower rate, N.V.=38.9 wt %, viscosity=18 sec./#4FC·20° C.

The compositions of the coating compositions and the properties of run or sag of the coating compositions were as shown in the following table 1 and table 2. In table 1, the temperature attached to each component represents the boiling point of the component. The running limit thicknesses shown in table 2 are values when the temperature of the coating composition is held at 20° C.

TABLE 1

| | standard compo. | comparison 1 | comparison 2 |
|---|---|---|---|
| resin | acryl-melamine | acryl-melamine | acryl-melamine |
| viscosity (20° C.) | 22 sec./#4FC | 25 sec./#4FC | 18 sec./#4FC |
| NV (wt %) | 40.0 | 41.8 | 38.9 |
| solvent (wt %) | | | |
| toluene (109~112° C.) | 18 | 29.1 | 5.1 |
| xylene (135~142° C.) | 24 | 11.6 | 31.6 |
| solvesso100 (135~142° C.) | 7 | 6.8 | 13.2 |
| ethyl acetate (75~85° C.) | — | 7.8 | — |
| n-butyl acetate (118~128° C.) | 8 | — | 8.1 |
| n-butanol (116~119° C.) | 3 | 2.9 | 3.1 |
| total (wt %) | 100 | 100 | 100 |

TABLE 2

| | standard compo. | | | comparison 1 | comparison 2 |
|---|---|---|---|---|---|
| running limit thickness | 41μ | | | 49μ | 32μ |
| run (mm) | | | | | |
| film thickness | 40μ | 60μ | 80μ | 60μ | 60μ |
| during setting 20° C. × 60 min | 0 | 86 | 195 | 35 | 284 |
| during heating (setting) 20° C. × 8 min (temp. raising) 15° C./min × 8 min 140° C. × 20 min | 0 | 75 | 142 | 58 | 192 |

The run during setting shown in table 2 was measured in the following manner. In the same manner as described above with reference to FIGS. 3A and 3B, after masking the lower half of the vertical surface of a work by a masking tape, the coating composition was applied to the surface and the tape was removed. Then the work was subjected to setting in an atmosphere of 20° C. for 60 minutes with the coated surface held vertical. The run of the coating composition was measured at the end of the setting. The run during heating shown in table 2 was measured in the following manner. After masking the lower half of the vertical surface of a work by a masking tape, the coating composition was applied to the surface and the work was subjected to setting in an atmosphere of 20° C. for 8 minutes while the work being rotated. Then the coated surface was held vertical and the tape was removed. Then the work was put in a heating oven and the temperature of the atmosphere in the oven was raised to 140° C. at a rate of 15° C./min in 8 minutes. Thereafter the work was caused to stand for 20 minutes with the temperature in the oven held at 140° C. The run of the coating composition was measured at the end of the heating step.

(3) interval interval between the end of the base coating and the initiation of the clear coating: 8 minutes (4) coating conditions

| | |
|---|---|
| :coater | electrostatic rotary spray coater |
| :shaping air | 1.5 khg/cm$^2$ |
| spraying rate | 200 to 300 cc/min |
| voltage | −90 kV |
| distance | 300 mm |

(4) way of coating double coating (with interval of 2 minutes between the first coating and the second coating)

while conveying the work at a speed of 4.0 m/min with the work fixed in the vertical direction, the coating composition was sprayed onto the work at right angles thereto in reciprocating motion (stroke of reciprocation=500 mm, reciprocating speed=18 m/min)

ratio of the thickness of the coating film applied first to that of the coating film applied second: 2:3 (controlled by the spraying rate)

(c) conditions in the spraying room temperature=20°±1° C., humidity=75±5%RH, wind velocity=0.3 to 0.4 m/sec (d) rotating conditions Taking into account the conditions in coating of the vehicle body, the test piece was caused to stand for 2 minutes in the coating position after the clear coating was ended, and then the test piece was set to a rotating device in a position away from the rotational axis of the device by 80 cm. Then the test piece was rotated at 10 rom. Running or sagging of the coating composition did not occur while the test piece was caused to stand for 2 minutes.

(e) Setting conditions and the heat-hardening conditions are given in the following description of the tests and the results of the tests.

(II) Tests (1) test 1

The test pieces were subjected to the surface treatment described above and then applied with the topcoating coating compositions. In the case of clear coating, the standard coating composition was applied and the coating film was of the standard thickness, 60μ. Thereafter the test pieces were rotated under the conditions described above and subjected to the setting step and the heat-hardening step under the following conditions. The state of the coating compositions at the end of the setting and the smoothness of the coating film surface after the heat-hardening were measured in the following manners.

(a) setting

The test pieces were subjected to the setting at the following different setting temperatures for the following different setting times while being rotated under the conditions described above.

(1) setting temperature (atmospheric temperature of the setting atmosphere) 20°±1° C., 30°±1° C. (humidity=75±5%RH, wind velocity=0.3 to 0.4 m/sec)

(2) setting time 4, 6, 8, 10, 15, 30, 60 minutes (b) heat-hardening

The test pieces which had been subjected to the setting under the different conditions described above were put in a heating oven immediately after the setting. In the heating oven, the test pieces were rotated under the same conditions. The atmospheric temperature in the oven was held at 140° C. Ten minutes after, rotation of the test pieces was stopped, and the test pieces were caused to stand in the oven for 15 minutes with the atmospheric temperature in the oven held at 140° C.

(c) measurement of the state of the coating composition (1) measurement of NV value The NV values of the clear coating composition (proportion of the solid component in the coating composition) before (after spraying the coating composition) and after (immediately before introduction of the test pieces into the oven) the setting were determined by a gravimetric method according to the following formula. {weight of the composition after heating at 140° C. (temperature of the atmosphere) for 25 minutes}/{weight of the composition at the time of measurement (2) measurement of flowability (run or sag)

The flowabilities (run or sag) of the clear coating compositions immediately before introduction of the test pieces into the oven (at the end of the setting) were measured in the following manner. That is, the test pieces (400×400 mm in size) were subjected to the aforesaid surface treatment, and the lower half of a vertical surface of each test piece was masked with tape in the same manner as described above with reference to FIGS. 3A and 3B. Then the coating composition (base coating composition or clear coating composition described above) was applied to over the entire area of the vertical surface. The test pieces with the mask and the coating composition were subjected to setting under the different conditions described above while being rotated under the condition described above. After the setting, the test pieces were removed with the mask and set vertical with the portion which were masked disposed down and were caused to stand for 60 minutes at temperatures equal to their respective setting temperatures. Then the run (length of run) of the coating composition was measured at the end of the setting.

(d) Measurement of smoothness of the coating film surface

Smoothness of the coating film surface of each test piece after the heat-hardening was measured in the following manner. That is, the imaging sharpness (smoothness) of the coating film surface was measured by use of an imaging sharpness measuring system manufactured by "Suga Shikenki, K.K.". In this measurement, a slit plate provided with linear slits are disposed between a surface to be measured and a light source and light from the light source is projected onto the surface through the slit plate. Then the image of the surface is taken by an image pickup device, and the imaging sharpness (NSIC value) is calculated on the basis of the linearity of the image of the slits and the brightness difference (the difference in brightness between the image of a slit and that of the adjacent background) in the image taken by the image pickup device. The NSIC value is a relative value to a value of 100 for a black mirror.

(2) test 2

Test 2 was carried out in the same manner as in test 1 except that the comparison composition 1 was used instead of the standard composition and the setting was effected only under the following conditions.

temperature=20°±1° C., time=4, 6 and 8 minutes (3) test 3

Test 3 was carried out in the same manner as in test 1 except that the coating film thickness was changed to 40μ from the standard thickness of 60μ and the setting was effected only under the following conditions.

temperature=20°±1° C., time=4, 6, 8, 10, 15, 30 and 60 minutes (4) test 4

Test 4 was carried out in the same manner as in test 1 except that the comparison composition 2 was used instead of the standard composition and the setting was effected only under the following conditions.

temperature=20°±1° C., time=4, 6, 8, 10, 15, 30 and 60 minutes (5) reference test A reference test was carried out for test 1 and test 2. In the reference test, test pieces having an extremely smooth surface were applied with the clear coating composition and were subjected to setting and heat-hardening in the same manner as in the test 1 and test 2. Then the smoothness of the coating film surface was measured. Each test piece of the reference test was prepared by applying intercoating composition to a polished plate (film thickness of 40 to 50μ), heat-hardening the intercoating and then smoothening the surface of the intercoating film by wet sanding (#1000).

(III) result of the tests

The results of the tests 1 to 4 and the reference test are shown in the following table 3 and table 4. In those tests, the test pieces were small in size and it may be considered that the temperatures of the coating compositions on the test pieces became equal to that of the atmospheres though there might be some time lag. The same is true for the following tests.

TABLE 3

| test | setting | heat- | NV (wt %) | | | run (mm) | | NSIC value | |
|---|---|---|---|---|---|---|---|---|---|
| No. | (°C. × minute) | hardening | after spray | before heating | in oven | before heating | in oven | | reference |
| #1 | 20 × 4 | held in | 55 | 63 | | 14 | | 69 | 93 |
| | 20 × 6 | 140° C. oven | 55 | 68 | | 12 | | 74 | 96 |
| | 20 × 8 | for 25 min. | 55 | 72 | | 8 | | 82 | 97 |
| | 20 × 10 | raised from | 55 | 75 | | 4 | | 84 | 97 |
| | 20 × 15 | 20° C. to | 55 | 80 | | 2 | | 85 | 97 |
| | 20 × 30 | 120° C. in | 55 | 83 | | 0 | | 85 | 97 |
| | 20 × 60 | 1 min. | 55 | 85 | | 0 | | 85 | 97 |
| | 30 × 4 | | 55 | 69 | | 11 | | 73 | 95 |
| | 30 × 6 | | 55 | 74 | | 7 | | 81 | 96 |
| | 30 × 8 | | 55 | 78 | | 4 | | 85 | 97 |
| | 30 × 10 | | 55 | 81 | | 2 | | 86 | 98 |
| | 30 × 15 | | 55 | 83 | | 1 | | 86 | 96 |
| | 30 × 30 | | 55 | 85 | | 0 | | 86 | 97 |
| | 30 × 60 | | 55 | 86 | | 0 | | 86 | 98 |

TABLE 4

| test | setting | heat- | NV (wt %) | | | run (mm) | | NSIC value | |
|---|---|---|---|---|---|---|---|---|---|
| No. | (°C. × minute) | hardening | after spray | before heating | in oven | before heating | in oven | | reference |
| | 20 × 4 | held in | 61 | 70 | | 7 | | 82 | 96 |
| #2 | 20 × 6 | 140° C. oven | 61 | 74 | | 3 | | 83 | 97 |
| | 20 × 8 | for 25 min. | 61 | 78 | | 2 | | 85 | 97 |
| | 20 × 4 | raised from | 55 | 65 | | 0 | | 40 | |
| | 20 × 6 | 20° C. to | 55 | 71 | | 0 | | 45 | |
| | 20 × 8 | 120° C. in | 55 | 73 | | 0 | | 47 | |
| #3 | 20 × 10 | 1 min. | 55 | 75 | | 0 | | 46 | |
| | 20 × 15 | | 55 | 81 | | 0 | | 48 | |
| | 20 × 30 | | 55 | 84 | | 0 | | 48 | |
| | 20 × 60 | | 55 | 85 | | 0 | | 47 | |
| | 30 × 4 | | 49 | 55 | | 78 | | 59 | |
| | 30 × 6 | | 49 | 57 | | 71 | | 64 | |
| | 30 × 8 | | 49 | 60 | | 33 | | 67 | |
| #4 | 30 × 10 | | 49 | 64 | | 21 | | 67 | |
| | 30 × 15 | | 49 | 68 | | 12 | | 73 | |
| | 30 × 30 | | 49 | 72 | | 4 | | 80 | |
| | 30 × 60 | | 49 | 75 | | 2 | | 81 | |

In tests 1 to 4, the setting conditions, the kind of the coating composition (especially the kind and the amount of the solvent therein), and the thickness of the clear coating film (coating thickness of the clear coating composition) were varied from test piece to test piece so that the flowability of the coating composition and the NV value therein at the end of the setting or at a predetermined time during the setting (will be simply referred to as "during setting", hereinbelow) varied from test piece to test piece, and the test pieces were placed in an oven whose atmosphere temperature had been held at 140° C. immediately after the end of the setting so that the coating compositions soon hardened. In this manner, the relation between the state of the coating composition during setting and the final smoothness of the coating film surface was investigated while avoiding the influence of the flowability provided to the coating film in the oven on the smoothness of the coating film.

From the results of the test 1 to 4, it can be recognized that when the coating composition has a flowability and at the same time the NV value is not smaller that 70% by weight (i.e., the amount of the solvent is not more than 30% by weight) during the setting, the NSIC value falls in a range not smaller than 80 and an extremely smooth coating film surface can be obtained without affected by the irregularities on the surface to be coated. By the conventional ordinary method, the NSIC value of the coating film surface is 70 or so at most. Accordingly, that the NSIC value is not smaller than 80 means that an extremely excellent smoothness of the coating film surface clearly distinguishable from that obtained by the conventional coating method can be obtained in accordance with the present invention.

The results of tests 1 to 4 will be described in more detail, hereinbelow.

From the result of test 1, it is recognized that the smoothness of the coating film surface becomes better as the NV value increases so long as the coating composition has a flowability before the test piece is heated in the oven, i.e., at the end of the setting. That is, since in test 1, the test piece was put into the oven held at 140° C. immediately after the end of the setting and the coating composition was immediately hardened, the NV value at the end of the setting may be regarded as the NV value just before the coating composition lost its flowability. Accordingly, it can be considered that as the NV value just before the coating composition loses its flowability (or the NV value at the time the coating composition loses its flowability) is larger, the smoothness of the coating film surface becomes better.

Further the result of test 1 shows that when the NV value just before the coating composition loses its flowability is smaller than 70% by weight, the NSIC value is smaller than 80, and when the NV value just before the coating composition loses its flowability is not smaller than 70% by weight, the NSIC value is not smaller than 80.

Irrespective of whether the setting temperature was 20° C. or 30° C., the coating composition had lost its flowability by the end of the setting when the setting time was set to 30 minutes or 60 minutes, and the NSIC values for the setting conditions of 20° C., 30 minutes and 20° C., 60 minutes were the same as that for the setting conditions of 20° C., 15 minutes and the NSIC values for the setting conditions of 30° C., 30 minutes and 30° C., 60 minutes were the same as that for the setting conditions of 30° C., 15 minutes. In the case where the setting time was 30 minutes or 60 minutes, the coating composition lost its flowability before the end of the setting and the NV value just before loss of flowability must be substantially equal to the NV value at the end of the setting of 15 minutes since the run at the end of the setting of 15 minutes was 2 mm at 20° C. and 1 mm at 30° C., which value indicated that the coating composition was about to lose its flowability. Accordingly from the fact that the NSIC values for the 30-minute setting and the 60-minute setting were equal to that for the 15-minute setting, it can be understood that the NV value just before loss of flowability governs the smoothness of the coating film surface irrespective of whether the coating composition loses its flowability during setting or at the end of the setting. Further the result of test 1 shows that the smoothness of the coating film becomes better with increase in the NV value just before the coating composition loses its flowability, and when the NV value just before the coating composition loses its flowability is not smaller than 70% by weight, the NSIC value is not smaller than 80.

Also the result of test 2 shows that the smoothness of the coating film becomes better with increase in the NV value just before the coating composition loses its flowability, and when the NV value just before the coating composition loses its flowability is not smaller than 70% by weight, the NSIC value is not smaller than 80. In test 2, the evaporating speed of the solvent was higher than that used in test 1 so that the NV value at the end of the setting for a given setting condition became larger as compared with in test 1. For the setting conditions of 20° C., 4 minutes, 20° C., 6 minutes and 20° C., 8 minutes, the NV values before heating were 63 wt %, 68 wt % and 72 wt %, respectively, in test 1 while the NV values before heating were 70 wt %, 74 wt % and 78 wt %, respectively, in test 2. The result of test 2 shows that when the NV value is increased by changing the coating composition, the NSIC value also increases.

In test 3, the flowability was lowered by reducing the thickness of the coating film. The result of test 3 shows that when the coating composition has not flowability even if the NV value is not smaller than 70 wt % at the end of the setting, the NSIC value is very small and cannot reach 80.

Also the result of test 4 shows that the smoothness of the coating film becomes better with increase in the NV value just before the coating composition loses its flowability, and when the NV value just before the coating composition loses its flowability is not smaller than 70% by weight, the NSIC value is not smaller than 80. In test 4, the evaporating speed of the solvent was lower than that used in test 1 so that the NV value at the end of the setting for a given setting condition became smaller as compared with in test 1. For the setting conditions of 20° C., 4 minutes, 20° C., 6 minutes and 20° C., 8 minutes, the NV values before heating were 63 wt %, 68 wt % and 72 wt %, respectively, in test 1 while the NV values before heating were 55 wt %, 57 wt % and 60 wt %, respectively, in test 4. The result of test 2 shows that when the NV value is reduced by changing the coating composition, the NSIC value also decreases.

As described above, reference tests were effected for tests 1 and 2. From comparison of the result of the reference test with the results of tests 1 and 2, it can be understood that the difference in NSIC value between the test 1 and the reference test and between the test 2 and the reference test for the same setting conditions becomes smaller as the NV value increases. For example, in the case of setting conditions of 20° C. in test 1, the differences were as follows.

| setting | NV value | difference in NSIC |
|---|---|---|
| 20° C. × 4 min. | 63 | 93 − 69 = 24 |
| 20° C. × 6 min. | 68 | 96 − 74 = 22 |
| 20° C. × 8 min. | 72 | 97 − 72 = 15 |
| 20° C. × 10 min. | 75 | 97 − 84 = 13 |
| 20° C. × 15 min. | 80 | 97 − 85 = 12 |

That the the difference in NSIC value becomes smaller as the NV value increases means that the smoothness of the coating film surface becomes less apt to be affected by the irregularities on the surface to be coated with increase in the NV values. Accordingly, it can be recognized that that the smoothness of the coating film surface becomes better as the NV value increases is because the smoothness of the coating film surface becomes less apt to be affected by the irregularities on the surface to be coated with increase in the NV values.

Control of the state of the coating composition during the heat-hardening step

Control of the state of the coating composition during the heat-hardening step will be described in more detail, hereinbelow. The inventors made various tests in which the state of the coating composition during the heat-hardening step was variously changed and the relation between the state of the coating composition during the heat-hardening and the smoothness of the coating film surface at the end of the heat-hardening was investigated. The tests will be described hereinbelow.

(I) Test conditions

The test conditions, i.e., the test pieces and the topcoating, were the same as those in the tests for the setting except that only the standard composition and the standard film thickness (60μ) were used in the clear coating.

(II) Tests (1) test 5

The test pieces were subjected to the surface treatment described above and then applied with a base coating and a topcoating. In the case of clear coating, the standard coating composition was applied and the coating film was of the standard thickness, 60μ. Thereafter the test pieces were rotated under the conditions described above and subjected to the setting step and the heat-hardening step under the following conditions. The state of the coating compositions during the heat-hardening and the smoothness of the coating film surface after the heat-hardening were measured in the following manners. Measurement of the smoothness was carried out in the manner described above.

(a) setting

The test pieces were subjected to the setting at the following setting temperature for the following different setting times while being rotated under the conditions described above.

(1) setting temperature

20°±1° C., (humidity=75±5%RH, wind velocity=0.3 to 0.4 m/sec)

(2) setting time 4, 6, 8, 10, 15, 30, 60 minutes (b) heat-hardening

Figure 15:
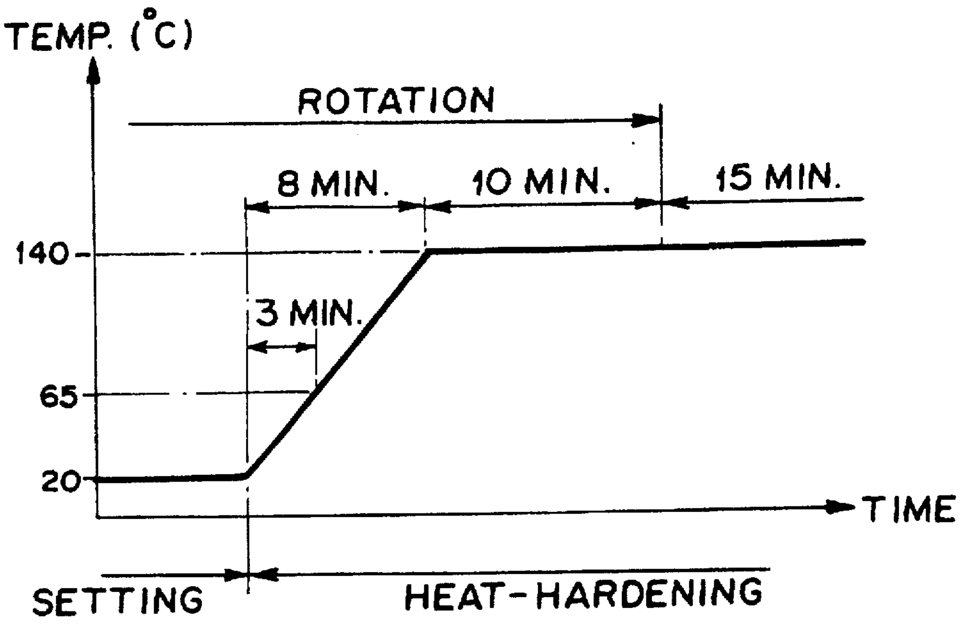
FIG. 15 is a view showing the change in the temperature of the coating composition in the test 5.

The test pieces which had been subjected to the setting under the different conditions described above were put in a heating oven immediately after the setting. In the heating oven, the test pieces were rotated under the same conditions. The temperature of the atmosphere in the oven was raised to 140° C. at a rate of 15° C./min in 8 minutes and then held at 140° C. The rotation of the test pieces were stopped 10 minutes after the temperature of the atmosphere in the oven reached 140° C. Thereafter the work was caused to stand for 15 minutes with the temperature in the oven held at 140° C. The change in the temperature of the coating composition in this period was as shown in FIG. 15.

(c) measurement of the state of the coating composition (1) measurement of NV value The NV values of the clear coating composition before (after spraying the coating composition) and after (immediately before introduction of the test pieces into the oven) the setting and 3 minutes after the temperature in the oven began to be raised (at the time the temperature in the over was 65° C.) were determined by the gravimetric method described above.

(2) measurement of flowability (run or sag)

Test pieces with the mask and the coating composition were prepared in the manner described above in conjunction with test 1, and were subjected to the setting and the heat-hardening under the conditions described above while rotating them under the condition described above. Three minutes after the temperature in the oven began to be raised, rotation of the test pieces was stopped and the test pieces were taken out of the oven. Then the test pieces were removed with the mask and set vertical with the portion which were masked disposed down and were caused to stand for 60 minutes at a temperature equal to the temperature in the oven at the time 3 minutes after the temperature in the oven began to be raised (65° C.). Then the run (length of run) of the coating composition was measured.

That the NV value and the run of the coating composition at the time 3 minutes after the temperature in the oven began to be raised were measured is because it was determined that a temperature of 65° C. at the time 3 minutes after the temperature in the oven began to be raised was the temperature just before the coating composition lost its flowability.

That is, as described above, it is considered that the NV value just before loss of flowability governs the smoothness of the coating film surface and accordingly it is necessary to investigate the relation between the NV value just before the coating composition loses its flowability in the oven and the NSIC value of the coating film surface. Thus, in order to investigate the temperature at which the coating composition loses its flowability in the oven, test pieces in which the NV values of the coating compositions just before they were put in the oven were set to 80% by weight were put in the oven and the temperature in the oven was raised from 20° C. in different rates of 10° C./min., 15° C./min. and 20° C./min. Then runs of the coating compositions were measured at various elapsed times for each temperature raising rate. The result was as shown in the following table 5.

TABLE 5

| elapsed | 10° C./min | | 15° C./min | | 20° C./min | |
|---|---|---|---|---|---|---|
| time | °C. | run (mm) | °C. | run (mm) | °C. | run (mm) |
| 1 | 30 | 9 | 35 | 8 | 40 | 7 |
| 2 | 40 | 6 | 50 | 6 | 60 | 2 |
| 3 | 50 | 5 | 65 | 2 | 80 | 0 |
| 4 | 60 | 2 | 80 | 0 | 100 | 0 |
| 5 | 70 | 1 | 95 | 0 | | |
| 6 | 80 | 0 | 110 | 0 | | |
| 7 | 90 | 0 | | | | |
| 8 | 100 | 0 | | | | |

The result of the test shows that the coating composition loses its flowability when the temperature in the oven is about 70° C. to 80° C. Accordingly, it is determined that the temperature in the oven just before the coating composition loses its flowability, i.e., the limit temperature at or below which the coating composition can keep its flowability, is about 65° C. For this reason, the NV value and the flowability of the coating composition at the time 3 minutes after the temperature in the oven began to be raised were measured.

(2) reference test

A reference test was carried out for test 5. The reference test was carried out in the same manner as that for tests 1 and 2 except that the setting was effect only under the conditions of 20° C., 4 minutes; 20° C., 8 minutes; 20° C., 30 minutes and 20° C., 60 minutes.

(III) result of the tests

The results of the test 5 and the reference test are shown in the following table 6.

TABLE 6

| test | setting | heat-hardening | | NV (wt %) | | | run (mm) | | NSIC value | |
|---|---|---|---|---|---|---|---|---|---|---|
| No. | (°C. × minute) | beginning | later | after spray | before heating | in oven | before heating | in oven | | reference |
| #5 | 20 × 4 | raised | held at | 55 | 63 | 81 | | 3 | 86 | 97 |
| | 20 × 6 | at | 140° C. | 55 | 68 | 84 | | 2 | 88 | |
| | 20 × 8 | 15° C./min. | for 25 min. | 55 | 72 | 85 | | 2 | 88 | 97 |
| | 20 × 10 | | | 55 | 75 | 87 | | 2 | 88 | |
| | 20 × 15 | | | 55 | 80 | 88 | | 2 | 89 | |
| | 20 × 30 | | | 55 | 83 | 88 | | 1 | 90 | 97 |
| | 20 × 60 | | | 55 | 85 | 90 | | 1 | 92 | 97 |

In test 5, by effecting the setting under different conditions so that the NV values just before the coating compositions lost flowability in the oven differ from each other, the relation between the NV value just before the coating composition loses flowability and the final smoothness of the coating film surface was investigated. The result of test 5 shows that as the NV value just before the coating composition loses its flowability in the heating oven increases, the smoothness of the coating film surface becomes better, and when the NV value is not smaller than 90 wt %, the NSIC value is not smaller than 90.

In test 5, the NV value just before the coating composition lost flowability in the oven was not smaller than 81 wt %, and the NSIC value for the NV value of 81 wt % was 86. Accordingly, the NV value just before the coating composition lost flowability in the oven at or over which NSIC value becomes not smaller than 80 cannot determined on the basis of the result of test 5. However the result of test 5 together with the result of tests 1 to 4 indicates that the NV value just before the coating composition loses flowability which determines the shrinkage of the coating film due to evaporation of the solvent after the coating composition loses flowability governs the NSIC value. Accordingly, it may be considered that it is not important the time the coating composition loses flowability or whether the coating composition loses flowability during the setting or heating in the oven. In other words, it may be considered that also in the case where the coating composition loses its flowability in the oven, when the NV values just before the coating composition loses flowability is not smaller than 70 wt %, the NSIC value can be not smaller than 80 like in the case where the coating composition loses its flowability during during setting. This may be recognized also from the relation between the NV value just before the coating composition loses flowability and the NSIC value observed in test 5.

For the same reason, the NSIC value can be not smaller than 90 when the NV values is not smaller than 90 wt % also in tests 1 to 4. This may be recognized also from the relation between the NV value just before the coating composition loses flowability and the NSIC value observed in tests 1 to 4.

Comparison of the NSIC values obtained in test 5 with those obtained in the reference test for test 5 also indicates that the smoothness of the coating film surface becomes less apt to be affected by the irregularities on the surface to be coated with increase in the NV values.

Control of the state of the coating composition during the heat-hardening step having the temperature holding step Control of the state of the coating composition during the heat-hardening step in which the temperature holding step is effected early the heat-hardening step in will be described in more detail, hereinbelow.

As described above, the NSIC value increases with increase in the NV value just before the coating composition loses its flowability in the heat-hardening step. Based on this recognition, we expected that when a temperature holding step of holding the temperature of the coating composition at a predetermined temperature lower than the reaction starting temperature and higher than the ordinary temperatures for a predetermined time was effected in the heat-hardening step, a larger amount of solvent could be quickly evaporated while the coating composition being kept in a state where it did not start reaction and kept its flowability, whereby the NV value just before lost of flowability could be quickly increased and a higher NSIC value could be obtained.

Then we made various tests in which the temperature holding step was effected early in the heat-hardening step and the relation between the state of the coating composition at the end of the temperature holding step and the smoothness of the coating film surface was investigated. The tests will be described hereinbelow.

(I) Test conditions

The test conditions, i.e., the test pieces and the topcoating, were the same as those in the tests for the setting except that only the standard composition and the standard film thickness (60μ) were used in the clear coating.

(II) Tests (1) test 6

The test pieces were subjected to the surface treatment described above and then applied with a base coating and a topcoating. In the case of clear coating, the standard coating composition was applied and the coating film was of the standard thickness, 60μ. Thereafter the test pieces were rotated under the conditions described above and subjected to the setting step and the heat-hardening step having the temperature holding step under the following conditions. The state of the coating compositions at the end of the temperature holding step and the smoothness of the coating film surface after the heat-hardening were measured in the following manners. Measurement of the smoothness was carried out in the manner described above.

(a) setting

The test pieces were subjected to the setting at the following setting temperature for the following different setting times while being rotated under the conditions described above.

(1) setting temperature

20°±1° C., (humidity=75±5%RH, wind velocity=0.3 to 0.4 m/sec)

(2) setting time 6, 10, 30 minutes (b) heat-hardening

The test pieces which had been subjected to the setting under the different conditions described above were put in a first heating oven, the atmosphere in which had been held at a predetermined temperature, immediately after the setting and held in the first oven for a predetermined time, whereby the test pieces were subjected to the temperature holding step. In the first heating oven, the test pieces were rotated under the same conditions. Thereafter the test pieces were immediately put in a second oven the atmosphere in which had been held at 140° C. and the rotation of the test pieces were stopped 10 minutes after. Thereafter the work was caused to stand for 15 minutes with the temperature in the oven held at 140° C.

Figure 16:
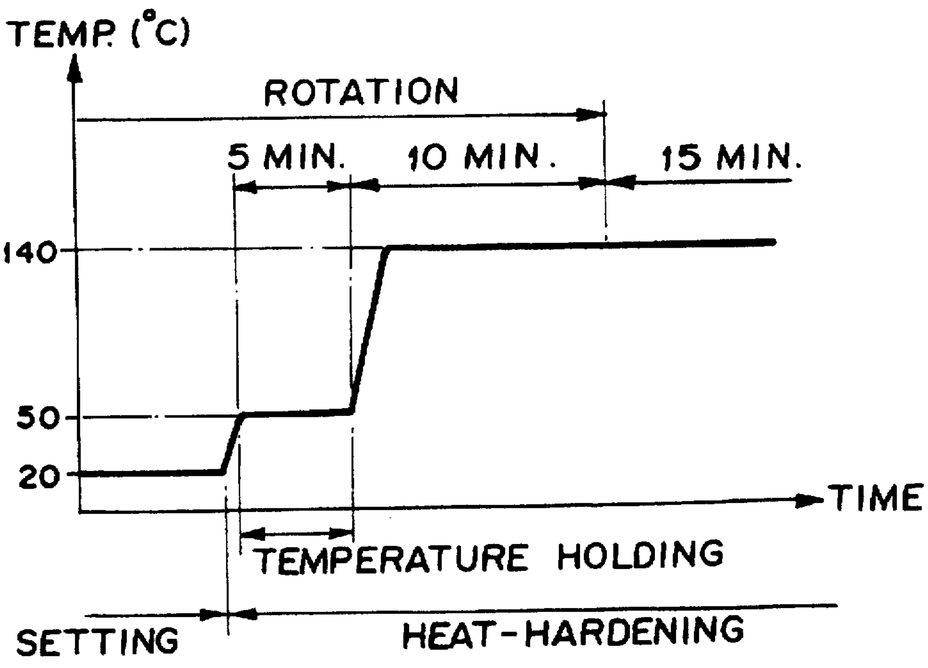
FIG. 16 is a view showing the change in the temperature of the coating composition in the test 6.

The temperature holding step was effected under the four different conditions of at 50° C. for 2 minutes; at 50° C. for 5 minutes; at 65° C. for 2 minutes and at 65° C. for 5 minutes taking into account the fact that the clear coating composition generally began reaction at about 70° to 80° C. The change in the temperature of the coating composition when the temperature holding step was effected at 50° C. for 2 minutes was as shown in FIG. 16.

(c) measurement of the state of the coating composition (1) measurement of NV value The NV values of the clear coating composition before (after spraying the coating composition) and after (immediately before introduction of the test pieces into the first oven) the setting and at the end of the temperature holding step were determined by the gravimetric method described above.

(2) measurement of flowability (run or sag)

Test pieces with the mask and the coating composition were prepared in the manner described above in conjunction with test 1, and were subjected to the setting and the temperature holding step under the conditions described above while rotating them under the condition described above. At the end of the temperature holding step, rotation of the test pieces was stopped and the test pieces were taken out of the first oven. Then the test pieces were removed with the mask and set vertical with the portion which were masked disposed down and were caused to stand for 60 minutes at a temperature equal to the temperature during temperature holding step. Then the run (length of run) of the coating composition was measured.

(1) test 7

In test 6, the temperature holding step was effected after the setting. In test 7, the relation between the state of the coating compositions at the end of the temperature holding step when the setting was not effected and the smoothness of the coating film surface after the heat-hardening were investigated.

Figure 17:
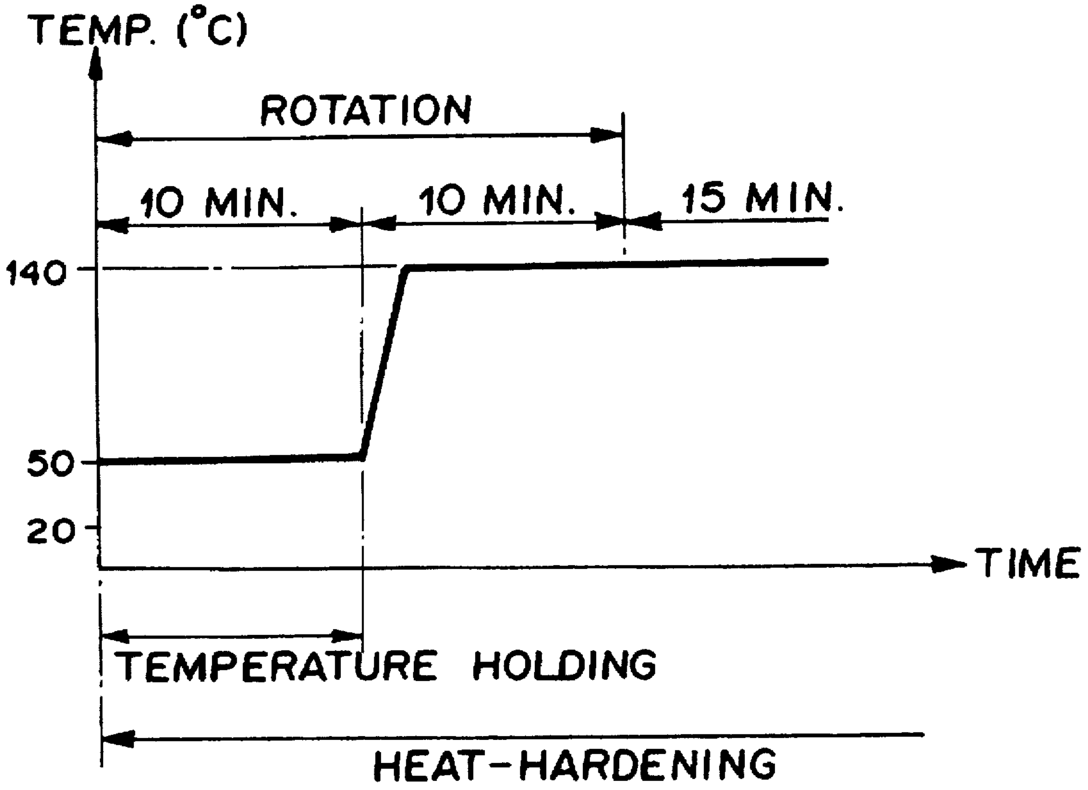
FIG. 17 is a view showing the change in the temperature of the coating composition in the test 7.

The test 7 was effected in the same manner as test 6 except that the setting was not effected and accordingly measurement of the NV value at end of the setting was not effected and the temperature holding step was effected under six different conditions of at 50° C. for 2 minutes; at 50° C. for 5 minutes; at 50° C. for 10 minutes; at 65° C. for 2 minutes; at 65° C. for 5 minutes and at 65° C. for 10 minutes. The change in the temperature of the coating composition when the temperature holding step was effected at 50° C. for 10 minutes was as shown in FIG. 17.

(3) reference test

A reference tests were carried out for tests 6 and 7. The reference tests were carried out in the same manner as that for the test 5 except that the setting was effect only under the conditions of 20° C., 6 minutes and 20° C., 30 minutes in the reference test for test 6 and only under the conditions of 50° C., 2 minutes; 50° C., 10 minutes, 65° C., 2 minutes and 65° C., 10 minutes in the reference test for test 7.

(III) result of the tests

The results of the tests 6 and 7 and the reference tests are shown in the following tables 7 and 8. Since in tests 6 and 7, the test piece was put into the second oven held at 140° C. immediately after the end of the temperature holding step and the coating composition was immediately hardened, the NV value at the end of the temperature holding step (in tables 7 and 8 shown as the NV value in oven) may be regarded as the NV value just before the coating composition lost its flowability.

TABLE 7

| | | heat-hardening | | NV (wt %) | | | run (mm) | | NSIC value | |
|---|---|---|---|---|---|---|---|---|---|---|
| test No. | setting (°C. × minute) | beginning (°C. × minute) | later | after spray | before heating | in oven | before heating | in oven | | reference |
| #6 | 20 × 6 | 50 × 2 | held at | 55 | 68 | 81 | | 4 | 88 | 97 |
| | 20 × 10 | 50 × 2 | 140° C. | 55 | 75 | 85 | | 3 | 88 | |
| | 20 × 30 | 50 × 2 | for 25 min. | 55 | 83 | 87 | | 4 | 90 | 97 |
| | 20 × 6 | 50 × 5 | | 55 | 68 | 88 | | 2 | 91 | 97 |
| | 20 × 10 | 50 × 5 | | 55 | 75 | 90 | | 1 | 92 | |
| | 20 × 30 | 50 × 5 | | 55 | 83 | 91 | | 1 | 92 | 97 |
| | 20 × 6 | 65 × 2 | | 55 | 68 | 85 | | 2 | 90 | 98 |
| | 20 × 10 | 65 × 2 | | 55 | 75 | 89 | | 2 | 90 | |
| | 20 × 30 | 65 × 2 | | 55 | 83 | 90 | | 1 | 91 | 97 |
| | 20 × 6 | 65 × 5 | | 55 | 68 | 91 | | 1 | 92 | 98 |
| | 20 × 10 | 65 × 5 | | 55 | 75 | 92 | | 2 | 93 | |
| | 20 × 30 | 65 × 5 | | 55 | 83 | 92 | | 1 | 92 | 98 |

TABLE 8

| | heat-hardening | | NV (wt %) | | | run (mm) | | NSIC value | |
|---|---|---|---|---|---|---|---|---|---|
| test No. | beginning (°C. × minute) | later | after spray | before heating | in oven | before heating | in oven | | reference |
| #7 | 50 × 2 | held at | 55 | | 67 | | 14 | 75 | 95 |
| | 50 × 5 | 140° C. | 55 | | 77 | | 4 | 85 | |
| | 50 × 10 | for 25 min. | 55 | | 84 | | 2 | 87 | 97 |
| | 65 × 2 | | 55 | | 71 | | 10 | 80 | 98 |
| | 65 × 5 | | 55 | | 83 | | 3 | 86 | |
| | 65 × 10 | | 55 | | 89 | | 1 | 87 | 97 |

From the result of test 6, it can be recognized that, as compared with when the temperature of the atmosphere in the oven is linearly raised as in test 5, the NV value just before the coating composition loses its flowability can be increased and NSIC value can be thereby increased when the temperature holding step is effected as in test 6.

That is, when the result of test 6 is compared with that of test 5, it can be seen that the NV value just before lost of flowability and the NSIC value were larger in either of the cases where the temperature holding steps of 50° C., 5 minutes; 65° C., 2 minutes and 65° C., 5 minutes were effected than in test 5 irrespective of the setting conditions (20° C., 6 minutes; 20° C., 10 minutes and 20° C., 30 minutes) though there was not so large difference in the case of the temperature holding step of 50° C., 2 minutes, and when the NV value was not smaller than 90%, the NSIC could be not smaller than 90 as shown in the following table 9.

TABLE 9

| | | test 6 | | | |
|---|---|---|---|---|---|
| | | 50° C. | | 65° C. | |
| setting °C. × min | test 5 NV–NSIC | 2 min. NV–NSIC | 5 min. NV–NSIC | 2 min. NV–NSIC | 5 min. NV–NSIC |
| 20 × 6 | 84–88 | 81–88 | 88–91 | 85–90 | 91–92 |
| 20 × 10 | 87–88 | 85–88 | 90–92 | 89–90 | 92–93 |
| 20 × 30 | 88–90 | 87–90 | 91–92 | 90–91 | 92–92 |

Though it is expected that when the heat-hardening is effected without effecting the setting step, the NV value before the test piece is put in the oven is small and the NV value just before the coating composition loses its flowability in the oven becomes small, which results in a small NSIC value, the NV value just before lost of flowability can be made not smaller than 70 wt % by effecting the temperature holding step early in the heat-hardening step even if the setting is not effected (except the temperature holding step of 50° C., 2 minutes), whereby NSIC value of not smaller than 80 can be ensured as the result of test 7 indicates.

Comparison of the NSIC values obtained in tests 6 and 7 with those obtained in the reference tests also indicates that the smoothness of the coating film surface becomes less apt to be affected by the irregularities on the surface to be coated with increase in the NV values as in tests 1 and 2.

As can be understood from the results of tests 1 to 7, in the rotary coating where the coating composition is applied to a thickness not smaller than the running limit thickness and the work is rotated so that the coating composition does not run or sag, the NSIC value of the final coating film surface increases and a better smoothness can be obtained as the NV value in the coating composition just before the coating composition loses its flowability during rotation of the work, that is, as proportion of the solvent in the coating composition just before the coating composition loses its flowability during rotation of the work. The coating composition may lose its flowability at any of during the setting, at the end of the setting and during the heat-hardening.

When the NV value just before the coating composition loses its flowability is not smaller than 70% by weight, that is, when the proportion of the solvent in the coating composition just before the coating composition loses its flowability is not larger than 30% by weight, the NSIC value can be not smaller than 80 without affected by the irregularities on the surface to be coated and an excellent smoothness of the coating film surface which could not obtained by the conventional coating methods can be constantly ensured. Further when the NV value just before the coating composition loses its flowability is not smaller than 90% by weight, that is, when the proportion of the solvent in the coating composition just before the coating composition loses its flowability is not larger than 10% by weight, the NSIC value can be not smaller than 90 and a much better smoothness can be obtained.

In other words, when the coating composition has a flowability and the proportion of the solvent in the coating composition is not larger than 30% at a time during the setting or the heat-hardening or at the end of the setting, the NSIC value can be constantly not smaller than 80 and when the proportion of the solvent in the coating composition is not larger than 10% at that time, the NSIC value can be constantly not smaller than 90, whereby a very excellent smoothness of the coating film surface can be obtained.

Further, when the temperature holding step of holding the temperature of the coating composition at a predetermined temperature lower than the reaction starting temperature and higher than the ordinary temperatures for a predetermined time was effected in the heat-hardening step, the proportion of the solvent in the coating composition just before lost of flowability can be further reduced and a better smoothness of the coating film surface can be obtained.

What is claimed is:

1. A method of coating comprising:

(a) a coating step wherein a flowable thermosetting coating composition having a reaction starting temperature is applied to a work at an ambient temperature;

(b) a preliminary heat-hardening step to harden the coating composition to a degree required to prevent running or sagging, including (i) a temperature holding step, wherein the coating composition is heated to a first temperature higher than the ambient temperature of the coating step but lower than the reaction starting temperature for the coating composition to impart flowability to the coating composition; wherein said first temperature is held for a time period during which the work is rotated to prevent the coating composition from running or sagging; and (ii) a reaction hardening step, wherein the coating composition is heated to a temperature higher than the reaction starting temperature so that the flowability of the coating composition is hardened to a degree required to prevent running and sagging; and (c) a main heat hardening step, wherein the coating composition is further heated to a second temperature higher than the reaction starting temperature to substantially completely harden it, and wherein the solvent accounts for not more than 30% by weight of the coating composition by the time the coating composition loses its flowability.

2. A method of coating as defined in claim 1, wherein the solvent accounts for not more than 10% by weight of the coating composition at the end of the main heat hardening step (d).

3. A method of coating as defined in claim 1, wherein the preliminary heat hardening step (c) is carried out by conveying the work through a divided heating device having a plurality of heating zones with independently temperature controllable heat sources arranged sequentially in the direction the work is conveyed through said heating device.

4. A method of coating as defined in claim 1, wherein said time period of step (b)(i) is not shorter than one minute.

5. A method of coating as defined in claim 1, wherein in the preliminary heat hardening step (b) the coating composition is heated by infrared radiation.

6. A method of coating as defined in claim 5, wherein in the main heat hardening step (c) the coating composition is heated by blowing heated air on the work.

7. A method of coating comprising:

(a) a coating step of applying to a work a solvent-containing flowable thermosetting coating composition having a reaction starting temperature and containing more than 30% by weight of said solvent to a thickness greater than a limit thickness over which the coating composition on a surface of the work extending in a vertical direction will normally run or sag during a heat hardening step;

(b) a setting step conducted after the coating step at a temperature which causes the solvent in the coating composition to evaporate, wherein said work is rotated about a substantially horizontal axis to prevent the coating composition on a vertical surface of the work from running or sagging;

(c) a preliminary heat hardening step to harden the coating composition to a degree required to prevent running or sagging, including (i) a temperature holding step wherein the coating composition is heated to a first temperature higher than the temperature of the setting step but lower than the reaction temperature for the coating composition to impart flowability to the coating composition, wherein said first temperature is held for a predetermined time period during which the work is rotated to prevent the coating composition from running or sagging; and (ii) a reaction hardening step, wherein the coating composition is heated to a temperature higher than the reaction starting temperature so that the flowability of the coating composition is hardened to a degree required to prevent running or sagging; and (d) a main heat hardening step, wherein the coating composition is further heated to a second temperature higher than the reaction starting temperature to substantially completely harden it, and wherein the solvent accounts for not more than 30% by weight of the coating composition by the time the coating composition loses its flowability.

* * * * *